United States Patent
Shin et al.

(10) Patent No.: US 10,225,385 B2
(45) Date of Patent: Mar. 5, 2019

(54) MOBILE TERMINAL

(71) Applicant: LG ELECTRONICS INC., Seoul (KR)

(72) Inventors: Choonghwan Shin, Seoul (KR); Byunghwa Lee, Seoul (KR); Yongho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/577,157

(22) PCT Filed: Nov. 9, 2015

(86) PCT No.: PCT/KR2015/012010
§ 371 (c)(1),
(2) Date: Nov. 27, 2017

(87) PCT Pub. No.: WO2016/190498
PCT Pub. Date: Dec. 1, 2016

(65) Prior Publication Data
US 2018/0176352 A1 Jun. 21, 2018

(30) Foreign Application Priority Data
May 27, 2015 (KR) .................. 10-2015-0074235

(51) Int. Cl.
*H04B 1/38* (2015.01)
*H04M 1/02* (2006.01)

(52) U.S. Cl.
CPC ....... *H04M 1/0266* (2013.01); *H04M 1/0237* (2013.01)

(58) Field of Classification Search
CPC ............ H04M 1/2035; H04M 1/0237; H04M 1/0239; H04M 1/0266; H04M 1/0267; H04M 1/185
See application file for complete search history.

(56) References Cited

U.S. PATENT DOCUMENTS

| | | | |
|---|---|---|---|
| 8,493,730 B2* | 7/2013 | Shim ............... | G06F 1/1615 16/321 |
| 9,913,517 B2* | 3/2018 | Poon ............... | A45C 11/00 |
| 2014/0211399 A1* | 7/2014 | O'Brien ............ | G06F 1/1624 361/679.26 |

FOREIGN PATENT DOCUMENTS

| | | |
|---|---|---|
| KR | 10-2012-0117140 A | 10/2012 |
| KR | 10-2014-0079286 A | 6/2014 |
| KR | 10-2014-0099128 A | 8/2014 |
| KR | 10-2015-0018730 A | 2/2015 |

* cited by examiner

*Primary Examiner* — Tuan Pham
(74) *Attorney, Agent, or Firm* — Birch, Stewart, Kolasch & Birch, LLP

(57) ABSTRACT

A mobile terminal having a display unit configured to be expanded or contracted in at least one direction, a housing disposed at a lower part of the display unit and formed to enclose electrical components and a case covering a rear surface of the housing is provided. The case includes at least two divided cases separate from each other, and, when at least one of the divided cases moves in a first direction relative to another one of the divided cases, the display unit is expanded and contracted in response to the movement of the at least one divided case.

20 Claims, 28 Drawing Sheets

MOBILE TERMINAL

CROSS REFERENCE TO RELATED APPLICATIONS

This application is the National Stage filing under 35 U.S.C. 371 of International Application No. PCT/KR2015/012010, filed on Nov. 9, 2015, which claims the benefit of earlier filing date and right of priority to Korean Application No. 10-2015-0074235, filed on May 27, 2015, the contents of which are all hereby incorporated by reference herein in their entirety.

TECHNICAL FIELD

The present disclosure relates to a mobile terminal in which a screen displayed part is magnified according to user convenience and a control method thereof.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. More recently, mobile terminals have been configured to receive broadcast and multicast signals which permit viewing of content such as videos and television programs.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Efforts are ongoing to support and increase the functionality of mobile terminals. Such efforts include software and hardware improvements, as well as changes and improvements in the structural components.

Recently, in line with the introduction of flexible displays, a method of displaying a screen in various manners in pursuit of a change in conventional flat displays has been proposed.

Nonetheless, demand for displaying screens in various forms has been on the rise and research into displays which may be contracted and stretched has been conducted.

DISCLOSURE

Technical Problem

An aspect of the present disclosure is to solve the aforementioned problems and other problems.

Another aspect of the present disclosure is to provide a mobile terminal in which a display unit displaying a screen may be changed in various forms according to a user selection, and a control method thereof.

Technical Solution

According to an aspect of the present disclosure, a mobile terminal includes: a display unit expanded and contracted in at least one direction; a housing provided below the display unit and covering components; and a case covering a rear surface of the housing and forming an appearance, wherein the case is divided into at least two divided cases, and when at least one of the divided cases is moved in a first direction, the display unit is restrained by movement of the divided case and expanded and contracted together with the divided case.

The divided case may be in direct contact with the display unit or a housing may be interposed between the divided case and the display unit so that the display unit is restrained by movement of the divided case.

The mobile terminal may further include: a frame disposed between the housing and the case and exposed to the outside when the divided cases are moved.

The frame may be formed such that at least a portion thereof overlaps the divided cases.

The housing may include a plurality of sub-housings disposed to be spaced apart from each other, and each of the plurality of sub-housings may be formed in a region corresponding to a region of the divided case and moved together with the divided case.

The plurality of sub-housings may be electrically connected by a flexible circuit board or a cable.

A protrusion may be formed on an upper side surface of the sub-housing, two or more recesses may be formed on an inner side surface of the frame, and a guide may be formed to be movable along the recesses.

The plurality of sub-housings may include first and second sub-housings disposed to be adjacent to each other, and further include a shaft penetrating through the first and second sub-housings and having both ends fixed to first and second fixing parts respectively fixed to the first and second sub-housings, respectively; a first elastic body formed on an outer circumference of the shaft and provided between the first fixing part and the first sub-housing; and a second elastic body formed on an outer circumference of the shaft and provided between the second fixing part and the second sub-housing.

A protrusion may be formed on an outer side surface of the frame, an arrest recess may be formed on an inner side surface of the case, and the protrusion may be caught by the arrest recess.

The arrest recess may be formed to correspond to the number of recesses formed on the guide so that the divided cases are movable stepwise.

A plurality of elastic bodies may be provided in the plurality of sub-housings, and the modulus of elasticity of the plurality of elastic bodies may be the same or sequentially increased or decreased in the first direction.

A plurality of elastic bodies may be provided in the plurality of sub-housings, the modulus of elasticity of elastic bodies formed on both sides of an elastic body positioned at the center, among the plurality of elastic bodies, may be different from the modulus of elasticity of the elastic body positioned at the center, and the moduli of elasticity of the elastic bodies formed on the both sides may be the same.

A guide rail may be formed on a side surface of the frame, a guide recess may be formed on an inner side surface of the case, and the case may be slidably movable on the frame.

Stoppers may be provided on a side surface of the frame and spaced apart from each other, a recess may be formed on an inner side surface of the case, and a movement-restricted part restricted in movement by the stoppers may be formed at one point of the recess.

A grip part may be formed to be recessed toward an inner side on an outer side surface of each of the plurality of divided cases.

A grip sensing unit may be formed below the grip part to recognize grip of the divided case, and the grip sensing unit may be any one of a proximity/illumination sensor, a touch sensor, and a fingerprint recognition sensor.

When the grip sensing unit is a proximity/illumination sensor, a fine hole may be formed on the case, the frame, and the housing.

When the grip sensing unit is a touch sensor, a conductor may be provided below the grip part, the conductor may be disposed on a flexible circuit board connected to a main circuit board, and the conductor may be disposed in a through hole formed in the frame and the housing.

The divided case may include first and second divided cases disposed to be adjacent to each other, an extending part may be formed to be stepped downwards from an end portion of the first divided case, and an accommodating part may be formed at an end portion of the second divided case and recessed toward an upper surface from a lower surface to accommodate the extending part, so that the inside of the mobile terminal is concealed when the divided case is moved.

The cases may be divided into two or more divided cases by one or more diagonal lines of the mobile terminal, and the divided cases may be movable in a second direction perpendicular to the first direction.

The second direction may be a direction perpendicular to the first direction or a direction in which the diagonal line is formed.

The frame may be formed in a diagonal direction of the mobile terminal such that the inside of the mobile terminal is not exposed according to movement of the divided frames.

When the divided cases are moved in the second direction, an aspect ratio of the display unit may be maintained.

A grip part may be formed in the divided frame, and a grip sensing unit may be provided below the grip part to sense a movement direction of the divided frame.

The grip part and the grip sensing unit may be provided on left, middle, and right sides at a lower end of the divided cases.

In a first state in which the divided cases are in contact with each other, at least two of the divided cases may be spaced apart from each other to implement a second state in which the display unit is expanded, and in the second state, a first region as a display region in the first state and a second region expanded in the second state, relative to the first state, may be differentiated, and the same or different screens may be displayed in the first and second regions.

Screen information related to a screen displayed on the display unit may be displayed in the second region.

As an expanded region of the display unit is increased, more detailed screen information may be displayed.

Both ends of the divided cases may be formed of any one of leather, rubber, and urethane.

Advantageous Effects

The mobile terminal and the method for controlling the same have the following advantages and effects.

According to at least one of embodiments of the present disclosure, a user may selectively expand the entire region or a partial region of the display unit displaying a screen.

According to at least one of embodiments of the present disclosure, since the case and/or the housing is divided into a plurality of parts, the display unit may be expanded and contracted by moving only the case.

According to at least one of embodiments of the present disclosure, since the frame is disposed between the case forming an appearance of the mobile terminal and the housing modularizing a plurality of components, the inside of the mobile terminal may be prevented from being exposed according to movement of the case.

According to at least one of embodiments of the present disclosure, since the elastic member is provided within the plurality of sub-housings, the sub-housings may be semi-automatically moved when the display unit in an expanded state is restored.

According to at least one of embodiments of the present disclosure, since the plurality of elastic bodies are provided in the plurality of sub-housings and the modulus of elasticity of the plurality of elastic bodies are the same or sequentially increased or decreased, the display unit may be expanded in various manners and a specific region of the display unit may be selectively expanded.

According to at least one of embodiments of the present disclosure, since the grip part is disposed on the surface of the case and the grip sensing unit is formed below the grip part, user's grip may be recognized, and when a user preferred expanding scheme is already registered, the display unit may be expanded in the already registered expanding scheme preferred by the user.

According to at least one of embodiments of the present disclosure, the display unit may be expanded and contracted in a diagonal formation direction of the mobile terminal, as well as in a longitudinal direction of the mobile terminal.

According to at least one of embodiments of the present disclosure, since both ends of the divided cases and at least one point of a side surface of the divided case is formed of leather, grip feeling may be enhanced and completeness of design may be enhanced.

An additional scope of applicability of the present invention shall become obvious from the detailed description in the following. It is to be understood that both the foregoing general description and the following detailed description of the preferred embodiments of the present invention are exemplary and explanatory and are intended to provide further explanation of the invention as claimed.

BEST MODES

Figure 1A:
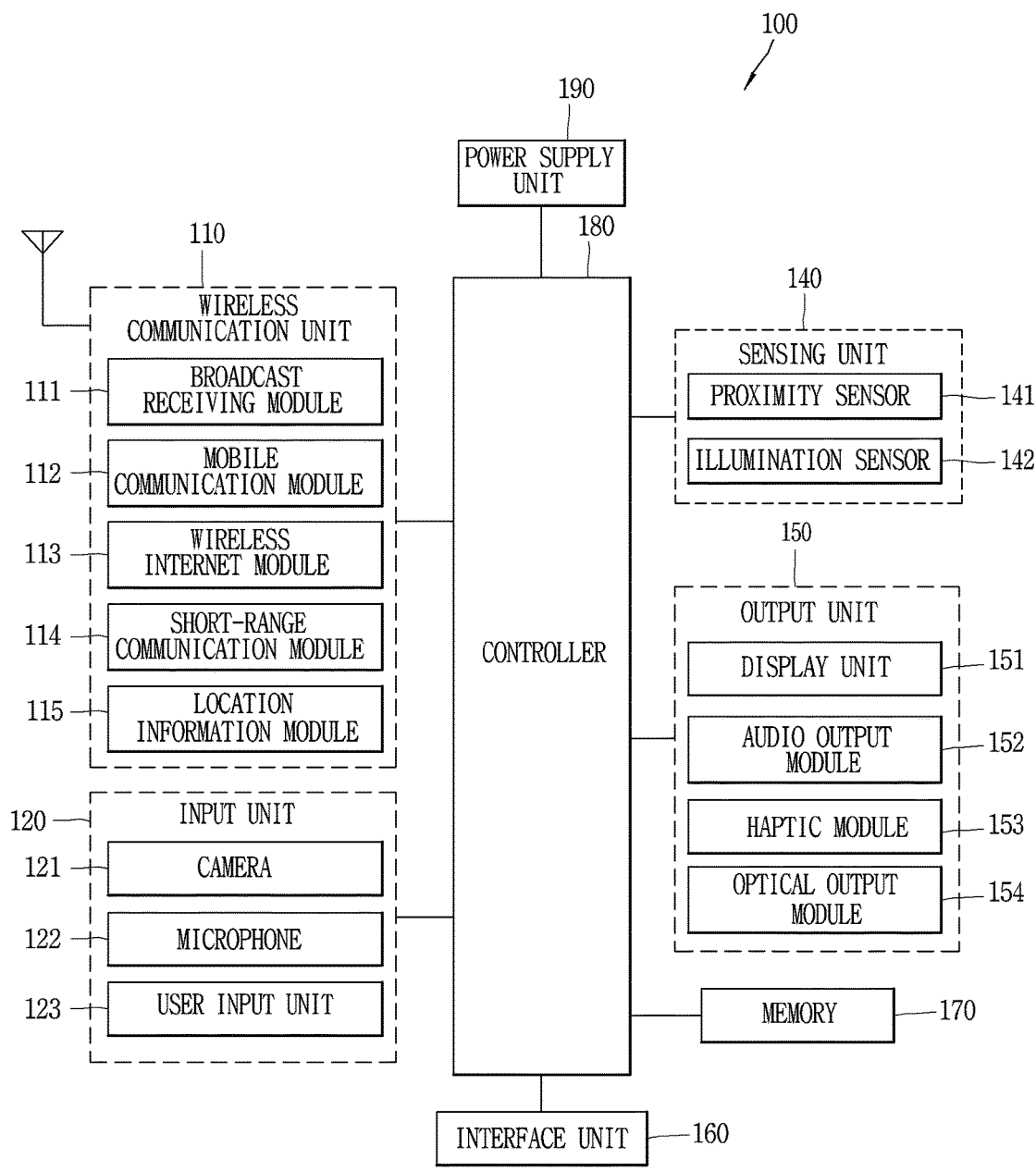
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
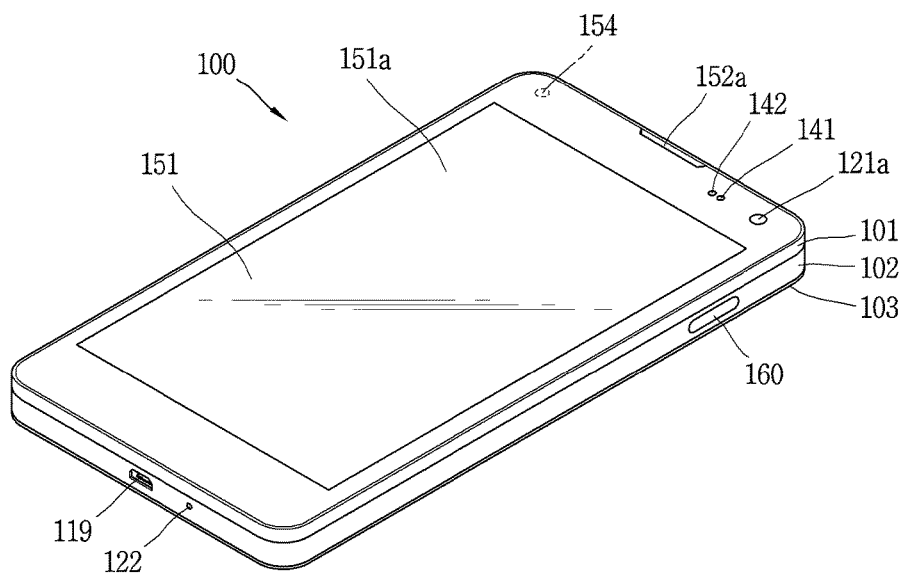
FIGS. 1B and 1C are conceptual views of one example of the mobile terminal, viewed from different directions.
Figure 1C:
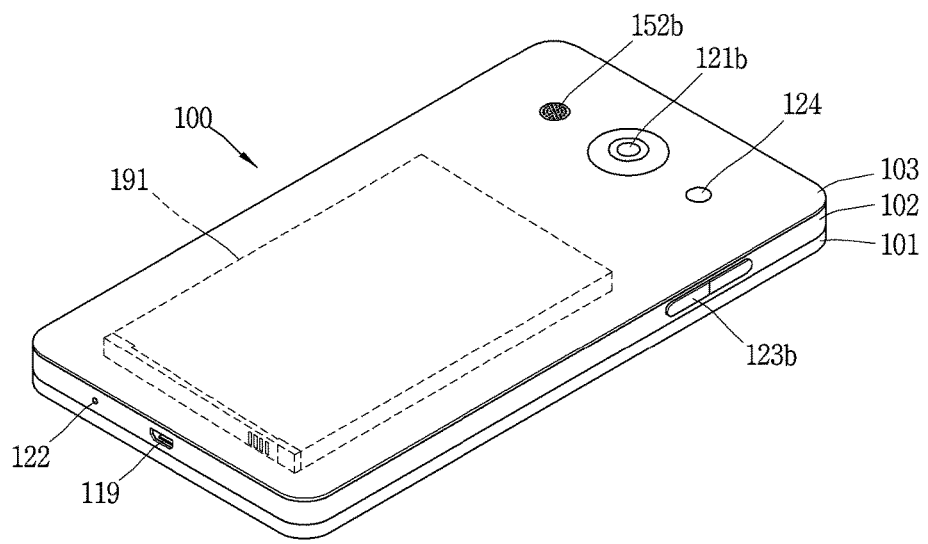

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like).

However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first audio output module 152a, the second audio output module 152b, the proximity sensor 141, the illumination sensor 142, the optical output module 154, the first camera 121a, the second camera 121b, the first manipulation unit 123a, the second manipulation unit 123b, the microphone 122, the interface unit 160, etc.

Hereinafter, the mobile terminal 100 will be explained with reference to FIGS. 1B and 1C. The display unit 151, the first audio output module 152a, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of the terminal body. The second audio output module 152b and the second camera 121b are arranged on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the control unit 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output unit 152a may be implemented as a receiver for transmitting a call sound to a user's ears, and the second audio output unit 152b may be implemented as a loud speaker for outputting each type of alarm sounds or a play sound of multimedia.

It may be configured such that the sounds generated from the first audio output module 152a are released along an assembly gap between the structural bodies (e.g., between the window 151a and the front case 101). In this case, a hole independently formed to output audio sounds may not be seen or hidden in terms of appearance, thereby further simplifying the appearance of the mobile terminal 100.

The optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented in such a manner that the mobile terminal emits monochromatic light or light with a plurality of colors. The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151, or may be stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The control unit 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, exemplary embodiments related to a control method that may be implemented in the mobile terminal configured as described above will be described with reference to the accompanying drawings. It will be apparent to those skilled in the art that modifications and variations can be made without departing from the spirit and scope of the invention.

Figure 2:
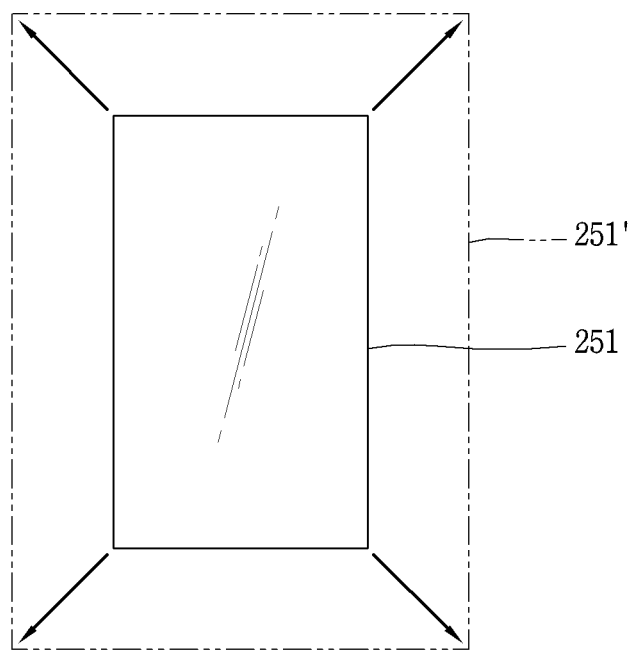
FIG. 2 is a conceptual view illustrating an example of a deformable mobile terminal according to an embodiment of the present disclosure.

FIG. 2 is a conceptual view illustrating an example of a deformable mobile terminal 200 according to an embodiment of the present disclosure.

As shown, the display unit 251 can be configured to be deformable by an external force. The deformation may be at least one of warping, bending, folding, twisting, and curling of the display unit 251, and further, the display unit 251 may be expanded and contracted in one or more directions. The expandable display unit 251 may be referred to as a 'stretchable display'. Here, the stretchable display unit may include both a general flexible display and an electronic paper (e-paper) and combinations thereof. In general, the mobile terminal 200 may include features of the mobile terminal 100 of FIGS. 1A to 1C or similar features.

A typical stretchable display is a display that is made stretchable as well as being warped, bent, folded, twisted or curled, unlike the characteristics of conventional flat panel displays.

The stretchable display unit 251 may be combined with a touch sensor to implement a stretchable touch screen. When a touch is applied to the stretchable touch screen, the controller 180 (see FIG. 1A) may perform control corresponding to the touch input. The stretchable touch screen may be configured to sense a touch input even in a last state (pulled or expanded state) as well as in an initial state (contracted state).

Meanwhile, the mobile terminal 200 according to an embodiment of the present disclosure may have a deformation sensing unit capable of sensing deformation of the stretchable display unit 251. The deformation sensing unit may be included in the sensing unit 140 (See FIG. 1A).

The deformation sensing unit may be provided in the stretchable display unit 251 or a case 210 to sense information related to formation of the stretchable display unit 251. Here, the information related to deformation may be a direction in which the stretchable display unit 251 is deformed, a degree of deformation, a deformed position, a deformation time, acceleration at which the stretchable display unit 251 is restored, and the like. In addition, the information related to deformation may be various types of information which may be sensed due to extension (or expansion) or contraction of the stretchable display unit 251.

Also, on the basis of information related to deformation of the stretchable display unit 251 sensed by the deformation sensing unit, the controller 180 may change information displayed on the stretchable display unit 251 or generate a control signal for controlling a function of the mobile terminal 200.

Meanwhile, the mobile terminal 200 according to an embodiment of the present disclosure may include the case 210 accommodating the stretchable display unit 251. The case 210 may be configured to be deformable together with the stretchable display unit 251 by an external force in consideration of the characteristics of the stretchable display unit 251.

This will be briefly described and will be described in detail hereinafter.

The display unit 251 may be expanded in such a manner that components within the mobile terminal 200 are moved or not. A scheme in which components are moved modularizes the components, and thus, it may be called a module type, and a scheme in which the components are not moved may be called a component fixed type. In the module type, each component is also expanded to be moved, and thus, each function is maintained and there is no limitation in charging or inserting an SD card, or the like.

The batteries 291a and 291b provided in the mobile terminal 200 may be configured to be movable together with the stretchable display unit 251 by an external force in consideration of characteristics of the stretchable display unit 251. For example, one or more batteries may be modularized to be moved together with the display unit 251.

A state of the stretchable display unit 251 is not deformed only by an external force. For example, when the stretchable display unit 251 is in a contracted state, the stretchable display unit 251 may be deformed to a stretched state by a command of the user or an application.

This may be possible by registering user fingers or registering an expanding scheme preferred by the user. That is, in case where it is registered that the user prefers extension and contraction in a longitudinal direction (y direction in FIG. 3A), when a body part of the user comes into contact with the grip part 215 (See FIG. 6A), the display unit 251 may be automatically elongated in the longitudinal direction.

Also, in case where the user wants to play video, or the like, while surfing, the display unit 251 may be expanded and contracted to a size or an aspect ratio according to a size of video. For example, when an aspect ratio provided from a server is 16:9, the display unit 251 may be expanded in an aspect ratio corresponding thereto. This function may be performed by the controller 180 (See FIG. 1A).

Hereinafter, embodiments related to the mobile terminal 200 configured as described above and a control method implemented in the mobile terminal 200 will be described with reference to the accompanying drawings. The present disclosure may be carried out in other specific ways than those set forth herein without departing from the spirit and essential characteristics of the present invention. Hereinafter, stretchability of the features (warping, bending, folding, twisting, curling, stretchability, etc.) of the display unit 251 will be largely described, but other features may also be applied.

FIG. 2 is a conceptual view illustrating stretchability of the display unit 251 related to an embodiment of the present disclosure. Referring to FIG. 2, a size (area) of the display unit 251 used in the mobile terminal 200, or the like, may be increased or decreased. For example, in the embodiment of the present disclosure, when the user pulls the display unit 251 the display unit 251 is stretched in a pulling direction, and when the external force is removed, the display unit 251 is returned to its original state. That is, in an embodiment of the present disclosure, the display unit 251 has properties similar to elastic deformation of rubber which may be recovered to its original state without permanent damage although a temporary structural deformation occurs due to a force applied from the outside. The stretchable display unit 251 should be able to be repeatedly deformed and should be able to be recovered to its original state within a determined deformation range.

Here, when an external force is removed from the display unit 251 in a stretched state, the display unit 251 may be restored to its original state by qualities of the display unit itself or may be restored to its original state when a separate restoring force is provided thereto. In an embodiment of the present disclosure, elastic members 2361 and 2362 (See FIG. 11) may be an example of means for providing a separate restoring force.

In FIG. 2, reference numeral 251 denotes a size of a display unit in an initial state, and 251' denotes a size of the display unit in a stretched state. FIG. 2 illustrates a state in which the display unit 251 is stretched in a diagonal direction, while maintaining an aspect ratio of the screen.

In order to secure stretchability of the stretchable display unit 251, a method of using a general metal electrode and using stretchability of a creased elastic substrate and a method of using a material of a stretchable electrode.

First, the method of using creases of an elastic substrate is a method of securing stretchability by using a stretchable material as a material of a substrate and forming creases on the substrate. Since creases are formed on the elastic substrate, stretchability may be obtained.

The method of using the elastic electrode material is a method of using a stretchable electrode material that uses an elastic substrate and maintains conductivity even when stretched. Here, the elastic electrode material may form a conductive material having elasticity by basically mixing an elastic material and conductive rubber. As elastic electrode materials, carbon nanotube (CNT), silver nano wire (AgNW), and Graphene are used on flexible substrates such as DMS (PolyDiMethy Siloxane), silicone rubber and acrylic rubber. Using these materials, high electrical conductivity is used and stretchability is secured. However, the present disclosure is not limited to the display unit manufactured according to the method described above.

An embodiment of the present disclosure relates to the mobile terminal 200 using the stretchable display. The stretchable display may be stretched in at least one direction to expand a display region.

Hereinafter, a first state refers to a state in which the display unit 251 of the mobile terminal 200 is not deformed in an initial state, and a second state refers to a state in which the display unit is stretched from the first state in which the display unit 251' is larger than in the first state and has an expanded display area. That is, the first state may be an initial state or a contracted state, and the second state may be a last state or a stretched state. Here, the second state may be divided into a plurality of states according to degrees of stretching. That is, in an embodiment of the present disclosure, the display unit may be expanded and contracted stepwise (See FIGS. 10A to 10D).

Figure 3A:
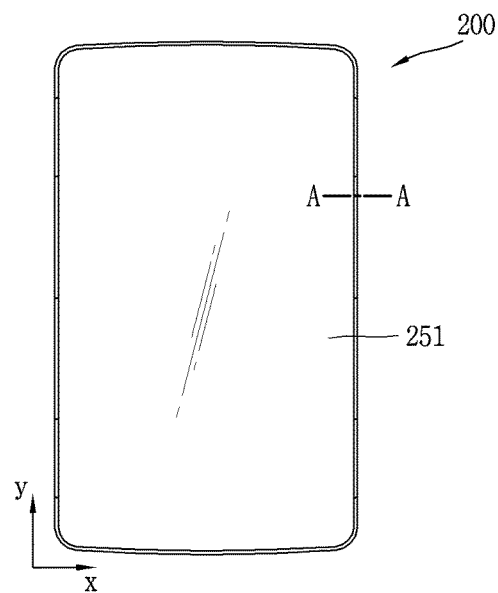
FIGS. 3A and 3B illustrate a front surface and a rear surface of a mobile terminal in a first state related to an embodiment of the present disclosure.
Figure 3B:
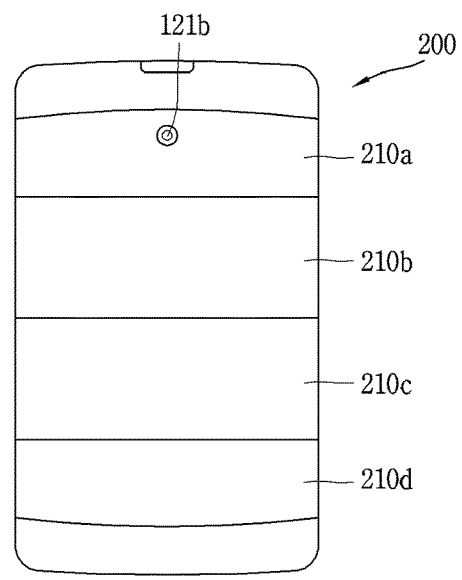
Figure 4A:
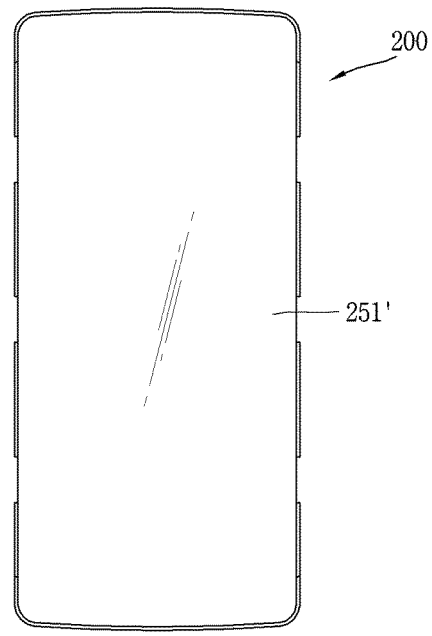
FIGS. 4A and 4B illustrate a front surface and a rear surface of a mobile terminal in a second state related to an embodiment of the present disclosure.
Figure 4B:
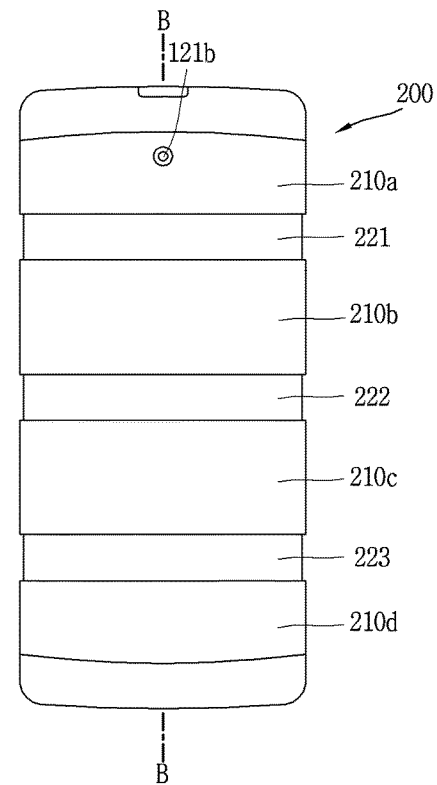

FIGS. 3A and 3B illustrate a front surface and a rear surface of the mobile terminal 200 in the first state related to an embodiment of the present disclosure, and FIGS. 4A and 4B illustrate a front surface and a rear surface of the mobile terminal 200 in the second state related to an embodiment of the present disclosure.

Referring to FIGS. 3A and 4A, it may be seen that the display units 251 and 251' of the mobile terminal 200 are increased.

Referring to FIGS. 3B and 4B, the external case 210 of an embodiment of the present disclosure is divided into a plurality of divided cases 210a, 210b, 210c, and 210d and the plurality of divided cases 210a, 210b, 210c, and 210d may be independently moved. Here, a movement scheme may be a sliding scheme, but the present disclosure is not limited thereto.

Hereinafter, the mobile terminal 200 according to an embodiment of the present disclosure will be described in detail.

The mobile terminal 200 according to an embodiment of the present disclosure includes the display unit 251 stretchable in at least one direction, a housing 230 provided below the display unit 251 and covering components, and a case 210 covering a rear surface of the housing 230, forming an appearance, and constraining movement of the display unit 251. The movement of the display unit 251 may be movement in one direction (See FIGS. 4A and 4B) and includes an increase in area (See FIG. 17) in multiple directions.

Here, a scheme in which the display unit 251 is restrained by the movement of the case 210 may be based on direct contact coupling between the case 210 and the display unit 251, based on indirect contact scheme in which a different component or member is interposed between the case 210 and the display unit 251. The term of the indirect contact scheme is a relative concept regarding the direct contact. This may be understood as a concept corresponding to a direct coupling scheme and an indirect coupling scheme described hereinafter.

The display unit 251 includes a stretchable display and a stretchable window (not shown) stacked on an upper surface of the display and stretchable together with the display. The stretchable display may be at least one of a liquid crystal display (LCD), a thin film transistor-liquid crystal display (TFT LCD), an organic light-emitting diode (OLED), a flexible display, and a 3D display, an e-ink display. The window and the display may be integrally bowed or stretchable, may be bonded by an adhesive, or may be modularized like a single component.

In this manner, in the mobile terminal 200, the display unit 251 is disposed above, and the housing 230 and the case 210 are sequentially disposed below. The case 210 may be divided into at least two divided cases 210a, 210b, 210c, and 210d, and when at least one of the divided cases 210a, 210b, 210c, and 210d is moved in the first direction, the display unit 251 stretched together with the display unit 251. Here, the display unit 251 is coupled to the case 210 by a fixing unit such as an adhesive tape 205, an adhesive agent, or a fastening member so as to be stretched.

Figure 5:
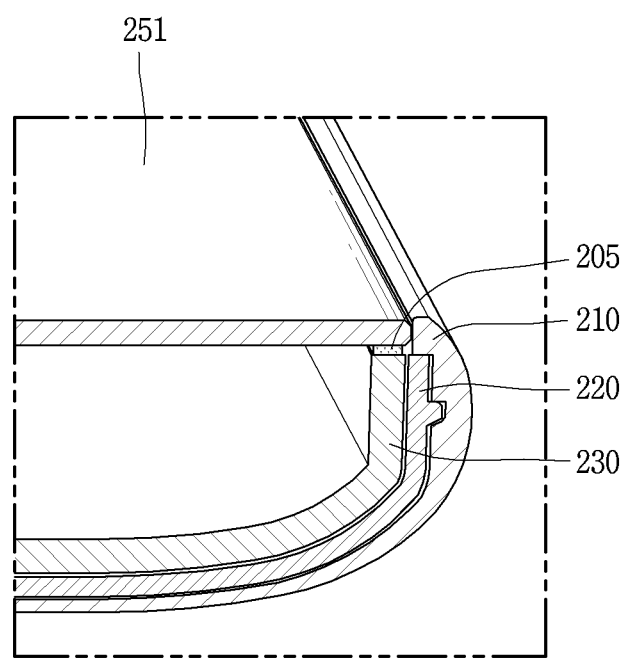
FIG. 5 is a cross-sectional view taken along line A-A of FIG. 3A.

That is, FIG. 5 is a cross-sectional view taken along line A-A of FIG. 3A. The display unit 251 may be coupled to the housing 230 by an adhesive tape 205, for example, and the display unit 251 may also be coupled to the case 210 by the adhesive tape 205, or the like, and moved according to movement of the divided cases 210a, 210b, 210c, and 210d. Here, as described hereinafter, when the housing 230 includes a plurality of sub-housings 230a, 230b, 230c, and 230d, the sub-housings 230a, 230b, 230c, and 230d may be moved together with the divided cases 210a, 210b, 210c, and 210d corresponding to the sub-housings 230a, 230b, 230c, and 230d.

Here, it is not required for all the parts of the housing 230 and the case 210 to be coupled with the display unit 251. For example, since the display unit 251 is stretched together as the divided cases 210a, 210b, 210c, and 210d are moved, the display unit 251 and the divided cases 210a, 210b, 210c, and 210d may be coupled in a direct contact or indirect contact manner. When the housing 230 is divided into the plurality of sub-housings 230a, 230b, 230c, and 230d, the sub-housings 230a, 230b, 230c, and 230d and the divided cases 210a, 210b, 210c, and 210d corresponding thereto are required to be moved together, and thus, the sub-housings 230a, 230b, 230c, and 230d and the divided cases 210a, 210b, 210c, and 210d corresponding thereto should be coupled to the display unit 251 in a direct manner or in an indirect manner.

That is, there is no need for all the sub-housings 230a, 230b, 230c, and 230d and the divided cases 210a, 210b, 210c, and 210d to be coupled to the display unit 251, and at least one of the sub-housings 230a, 230b, 230c, and 230d or the divided cases 210a, 210b, 210c, and 210d may be coupled to the display unit 251 and the other may be coupled to a component coupled to the display unit 251. For example, when the sub-housings 230a, 230b, 230c, and 230d are coupled to the display unit 251 by the adhesive tape 205, the divided cases 210a, 210b, 210c, and 210d may be coupled to only the sub-housings 230a, 230b, 230c, and 230d. Also, in this case, when the divided cases 210a, 210b, 210c, and 210d are moved, a force may be sequentially transmitted to the sub-housings 230a, 230b, 230c, and 230d and the display unit 251, so that the display unit 251 may be restrained according to movement of the divided cases 210a, 210b, 210c, and 210d and stretched and contracted in the direction of the divided cases 210a, 210b, 210c, and 210d.

Conversely, the divided cases 210a, 210b, 210c, and 210d may be directly coupled to the display unit 251 and the sub-housings 230a, 230b, 230c, and 230d may be coupled to the divided cases 210a, 210b, 210c, and 210d corresponding thereto. Also, in this case, the display unit 251 is restrained according to movement of the divided cases 210a, 210b, 210c, and 210d.

In the above, the divided cases 210a, 210b, 210c, and 210d corresponding to the sub-housings 230a, 230b, 230c, and 230d refer to divided cases 210a, 210b, 210c, and 210d moved together with the sub-housings 230a, 230b, 230c, and 230d when the case 210 and the components are divided into a plurality of regions to contract and stretch the display unit 251.

Figure 8A:
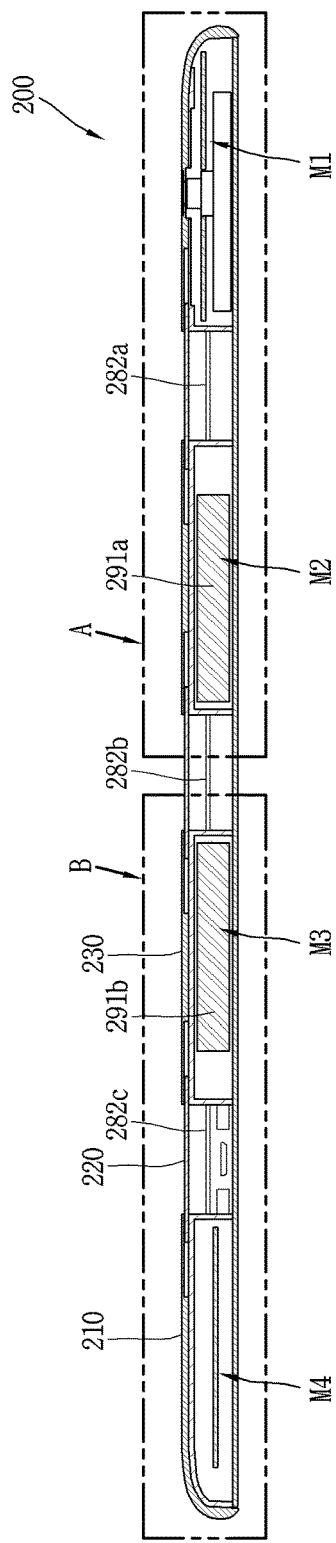
FIG. 8A is a cross-sectional view of a mobile terminal according to an embodiment of the present disclosure, taken along line B-B of FIG. 4B.
Figure 8B:
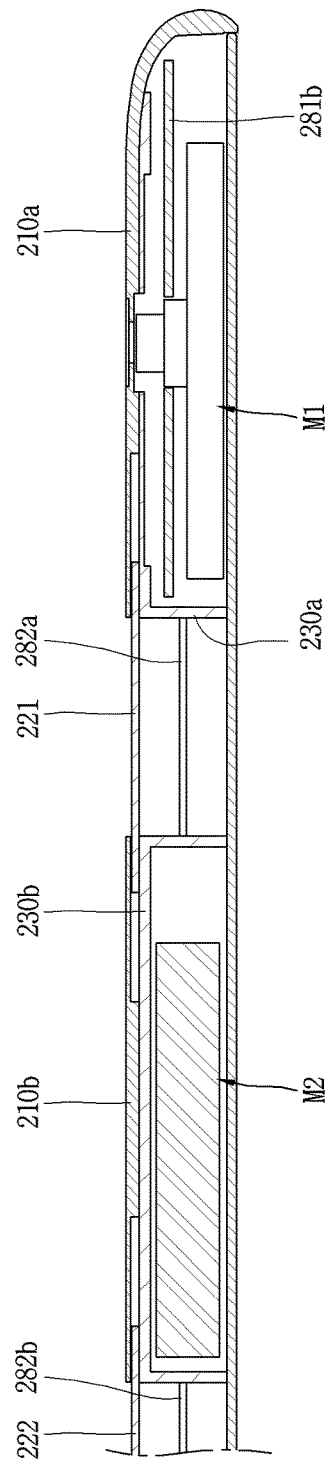
FIGS. 8B and 8C are enlarged cross-sectional views of portions A and B of FIG. 8A.
Figure 8C:
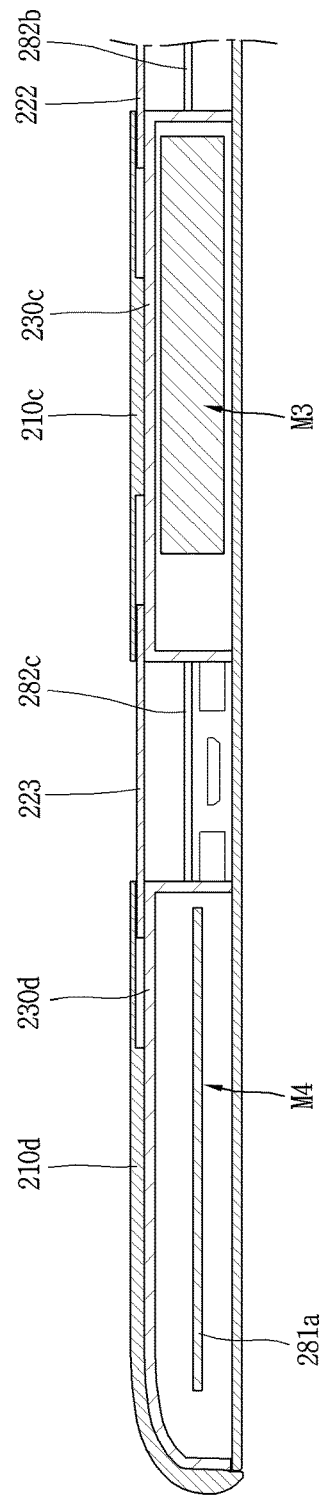

FIG. 8A is a cross-sectional view of the mobile terminal 200 according to an embodiment of the present disclosure and FIGS. 8B and 8C are enlarged cross-sectional views of portions "A" and "B" of FIG. 8A.

FIG. 8A illustrates a case where the case 210 and the housing 230 are divided into a plurality of regions and the divided cases 210a, 210b, 210c, and 210d and the sub-housings 230a, 230b, 230c, and 230d are moved simultaneously. Referring to FIGS. 8B and 8C, the case 210 is divided into first to fourth divided cases 210a, 210b, 210c and 210d, the housing 230 is divided into first to fourth sub-housings 230a, 230b, 230c, and 230d, and the first to fourth divided cases 210a, 210b, 210c and 210d are moved together with the first to fourth sub-housings 230a, 230b, 230c and 230d. Here, the first divided case 210a may be a divided case corresponding to the first sub-housing 230a. Conversely, the first sub-housing 230a may be referred to as a sub-housing corresponding to the first divided case 210a.

Also, in the direct coupling scheme according to an embodiment of the present invention, the first and second members in contact with each other are coupled to each other. In the indirect coupling scheme, the first and second members are not in contact with each other and a third member is interposed between the first and second members so that the first and second members are restrained to move with respect to each other. That is, the direct coupling scheme means a coupling scheme including direct contact, and the indirect coupling scheme means a coupling scheme including indirect contact.

In an example of the indirect coupling scheme, the sub-housings 230a, 230b, 230c, and 230d are coupled to the display unit 251 by direct contact, and the divided cases 210a, 210b, 210c and 210d are not in direct contact with the display unit 251 and coupled to the sub-housings 230a, 230b, 230c, and 230d. Here, the movement of the divided cases 210a, 210b, 210c, and 210d restrains movement of the display unit 251.

The display unit 251 may be fixed to the divided cases 210a, 210b, 210c and 210d and may be stretched and contracted together with the divided cases 210a, 210b, 210c and 210d. The fixing means (for example, the adhesive tape 205) is formed along the edge of a lower surface of the display unit 251 and needs not be formed in the entire area of the edge.

Also, preferably, each of the divided cases 210a, 210b, 210c and 210d and the sub-housings 230a, 230b, 230c and 230d are directly coupled to the display unit 251.

Meanwhile, since the display unit 251 is to be expanded and contracted by the movement of the case 210, the display unit 251 and the case 210 must be directly or indirectly coupled to each other. This relates to whether to divide parts formed in the mobile terminal 200 into modules or to form all the parts on one substrate as in the related art.

Figure 14A:
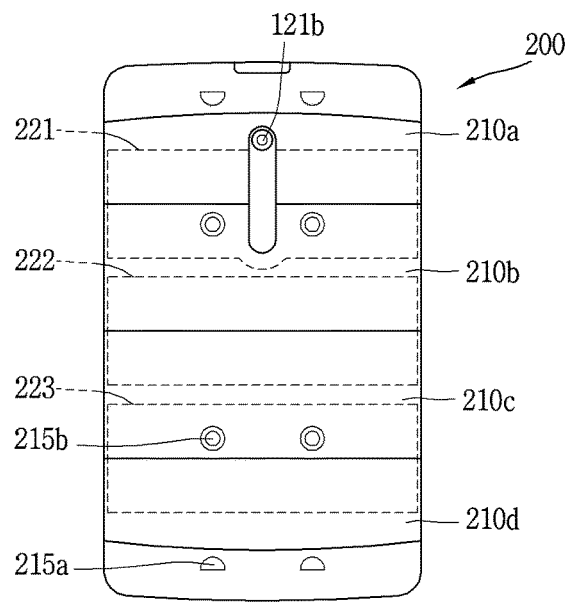
FIG. 14A is a view illustrating a case divided into four parts according to an embodiment of the present disclosure.
Figure 14B:
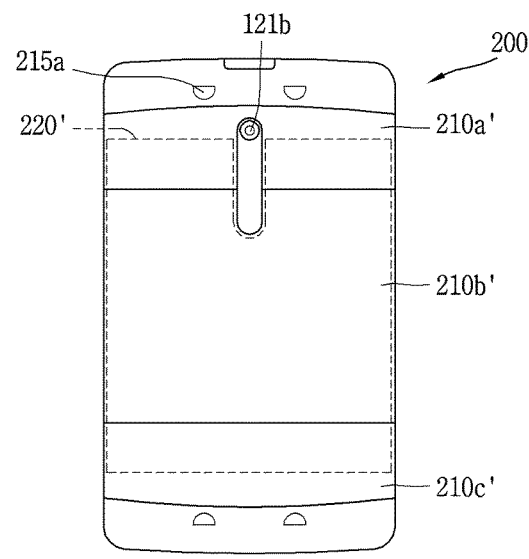
FIG. 14B is a view illustrating a case formed with three parts.
Figure 17:
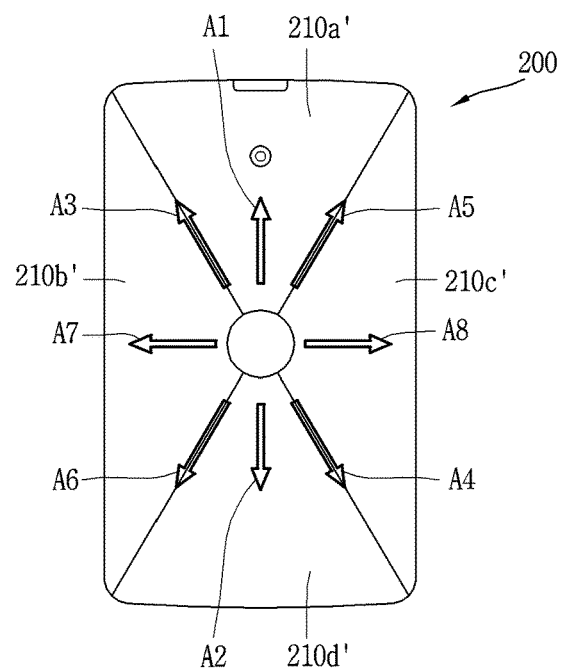
FIG. 17 is a rear view of a mobile terminal according to an embodiment of the present disclosure.

In an embodiment of the present invention, the case 210 is divided into at least two or more divided cases 210a, 210b, 210c, 210d, or 210a', 210b', 210c', 210d'. More specifically, as shown in FIGS. 14A and 14B, the case 210 may be divided into three or four divided cases 210a, 210b, 210c, and 210d, or as illustrated in FIG. 17, the case 210 may be divided into four divided cases 210a', 210b', 210c' and 210d'.

Since the display unit 251 is expanded and contracted according to the movement of the divided cases 210a, 210b, 210c, 210d, 210a', 210b', 210c' and 210d', the divided cases 210a', 210b', 210c', 210d' must be at least partially fastened to the display unit 251. For example, when there are four divided cases 210a, 210b, 210c, 210d, 210a', 210b', 210c', 210d', each of the divided case 210a, 210b, 210c, 210d, 210a', 210b', 210b', 210c', and 210d' is coupled with the display unit 251 so that the divided cases 210a, 210b, 210c, 210d, 210a' may be expanded and contracted no matter which of the divided cases 210a, 210b, 210c, 210d, 210a', 210b', 210c', 210d' is moved. However, only an expanded and contracted portion of the display unit 251 is different. Here, coupling of the display unit 251 and the divided cases 210a, 210b, 210c, 210d, 210a', 210b', 210c', 210d' includes indirect coupling as well as direct coupling.

The inside of the mobile terminal 200 may be seen through to the outside as the divided cases 210a, 210b, 210c, 210d, 210a', 210b', 210c' and 210d' are moved. In an embodiment of the present invention, In order to prevent this, the frames 220 and 220' are disposed between the housing 230 and the case 210. The frame 220 is disposed between the divided cases 210a, 210b, 210c, and 210d and has a larger width than an interval at which the adjacent divided cases 210a, 210b, 210c, and 210d are spaced apart from each other at a maximum level. This is for concealing the inside of the mobile terminal 200. That is, as illustrated in FIG. 4B, when the first to fourth divided cases 210a, 210b, 210c, and 210d are moved to expand the display unit 251, the first to third frames 221, 222 and 223 are provided between the first to second frames 210a, 210b, 210c and 210d so as to conceal the inside of the mobile terminal 200. Similarly, when the first to fourth divided cases 210a', 210b', 210c' and 210d' are formed, a frame 220' is formed along the diagonal line of the mobile terminal (see FIG. 19).

As described briefly above, there are two methods of expanding and contracting the display unit 251 provided in one embodiment of the present invention. A first method is a method of forming parts in the mobile terminal 200 into a plurality of modules and moving each of the modules together with the divided cases 210*a*, 210*b*, 210*c* and 210*d*. A second method is a method of integrally forming the components within the mobile terminal 200 like those of the related art and moving only the divided cases 210*a*, 210*b*, 210*c* and 210*d*. This method may be applied in the same manner to the case of forming the divided cases 210*a'*, 210*b'*, 210*c'* and 210*d'* in the diagonal direction of the mobile terminal 200. The same descriptions will be used for the divided cases 210*a*, 210*b*, 210*c*, and 210*d* formed in a longitudinal direction of the mobile terminal.

Hereinafter, the first method will be described.

The housing 230 is divided into the plurality of sub-housings 230*a*, 230*b*, 230*c* and 230*d* and a plurality of components are separated and modularized in the sub-housings 230*a*, 230*b*, 230*c* and 230*d* to form the sub-housings 230*a*, 230*b*, 230*c*, and 230*d* corresponding to the divided cases 210*a*, 210*b*, 210*c*, and 210*d*, whereby when the divided cases 210*a*, 210*b*, 210*c*, and 210*d* are moved, the sub-housings 210*a*, 210*b*, 210*c*, and 210*d* corresponding to the divided cases 210*a*, 210*b*, 210*c*, and 210*d* may also be simultaneously moved. That is, the mobile terminal 200 is provided with a plurality of electronic components including electronic components such as a plurality of chips and diodes. Since many electronic components cannot be expanded or contracted when the mobile terminal 200 is expanded or contracted, a component formation region where the components are mounted on the circuit board is formed by dividing into a plurality of region. The component formation region is not expanded or contracted, and only a region where no component is formed is expanded and contracted together with the display part 251.

That is, the component formation region is a region having a fixed size (area) which is not expanded and contracted, and the region where no component is formed is a region to be expanded and contracted. The component formation region may be a region corresponding to the divided cases 210*a*, 210*b*, 210*c*, and 210*d* and the sub-housings 230*a*, 230*b*, 230*c*, and 230*d*. In addition, since the component formation region is divided into a plurality of modules M1, M2, M3, M4 (See FIG. 8A), it may be a modularized region.

Here, each of the sub-housings 230*a*, 230*b*, 230*c*, and 230*d* covers the component formation regions divided into a plurality of regions to be separated from the adjacent component formation regions. However, since the plurality of sub-housings 230*a*, 230*b*, 230*c* and 230*d* and the electronic components should be electrically connected to each other, the plurality of sub-housings 230*a*, 230*b*, 230*c* and 230*d* and the electronic components are electrically connected by the flexible printed circuit boards (FPCBs) 282*a*, 282*b* and 283*c* or a connecting cable.

The region where the components are not formed is a region formed between adjacent sub-housings 230*a*, 230*b*, 230*c*, and 230*d*, and is a region expanded and contracted together with the display unit 251. The case 210, the frame 220, and the display unit 251 are sequentially formed in the region where no component is formed.

In other words, all the portions of the display unit 251 may be expanded or contracted, but it is preferable that portions of the display unit 251 spaced apart from each other are expanded or contracted. This is because, in order for all the portions of the display unit 251 to be expanded and contracted, both ends of the display unit 251 should be pulled out, and to this end, a relatively large force may be required to damage the display unit 251. However, if the display unit 251 having excellent stretchability is used, the both ends of the display unit 251 may be pulled out.

FIG. 8A is a diagram illustrating a plurality of electronic components are formed in a plurality of divided regions according to an embodiment of the present invention, and FIGS. 8B and 8C are enlarged views of portions "A" and "B" of FIG. 8A, illustrating upper and lower ends of the mobile terminal 200. Referring to FIGS. 8A to 8C, it may be seen that a plurality of components are disposed in a plurality of divided regions.

For example, the plurality of components may be modularized into first to fourth modules M1, M2, M3, and M4, and the modules M1, M2, M3, and M4 are divided by the first to fourth sub-housings 230*a*, 230*b*, 230*c*, and 230*d*, respectively. That is, the first to fourth modules M1, M2, M3, and M4 are partitioned by the first through fourth sub-housings 230*a*, 230*b*, 230*c*, and 230*d*. The first through fourth modules M1, M2, M3 and M4 are formed from the upper end to the lower end of the mobile terminal 200 and batteries 291*a* and 291*b* are respectively provided in the second and third modules M2 and M3. As in the embodiment of the present invention, a large amount of power may be consumed when the display is expanded and contracted, and thus, a spare (auxiliary) battery 291*b* may be additionally provided in addition to the main battery 291*a*.

It may be seen that the first to fourth divided cases 210*a*, 210*b*, 210*c* and 210*d* are not changed in shape and the first to third frames 221, 222 and 223 and the first to fourth modules M1, M2, M3 and M4 are also not changed in shape. For extension and contraction of the display unit 251, only the display unit 251 is changed in shape. In other words, the first to fourth divided cases 210*a*, 210*b*, 210*c* and 210*d*, the first to third sub-housings 221, 222, and 223 disposed between the first to fourth divided cases 210*a*, 210*b*, 210*c* and 210*d* and the first to fourth sub-housings 230*a*, 230*b*, 230*c*, and 230*d*, the first to fourth sub-housings 230*a*, 230*b*, 230*c*, and 230*d* covering the first to fourth modules M1, M2, M3, and M4, and the plurality of electronic components are moved only in position and are not changed in shape. They only serve to support the display unit 251 so that the display unit 251 may be smoothly expanded and contracted.

Here, the components disposed on the conventional printed circuit board may be sequentially arranged in the first through fourth modules M1, M2, M3, and M4, but the present invention is not limited thereto. For example, the first and second circuit boards 281*a* and 281*b* may be formed on the first module M1 and the fourth module M4, respectively, and a main battery 291*a* and an auxiliary battery 291*b* may be provided in the second and third modules M2 and M3, respectively.

Figure 9A:
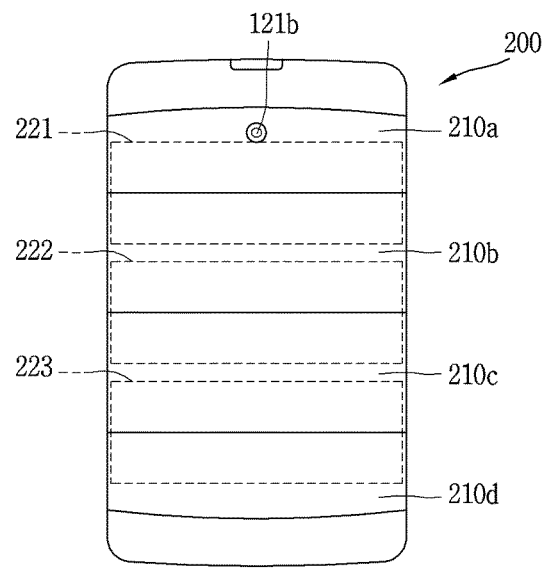
FIG. 9A is a view illustrating a rear surface of a mobile terminal in a first state according to an embodiment of the present disclosure.
Figure 9B:
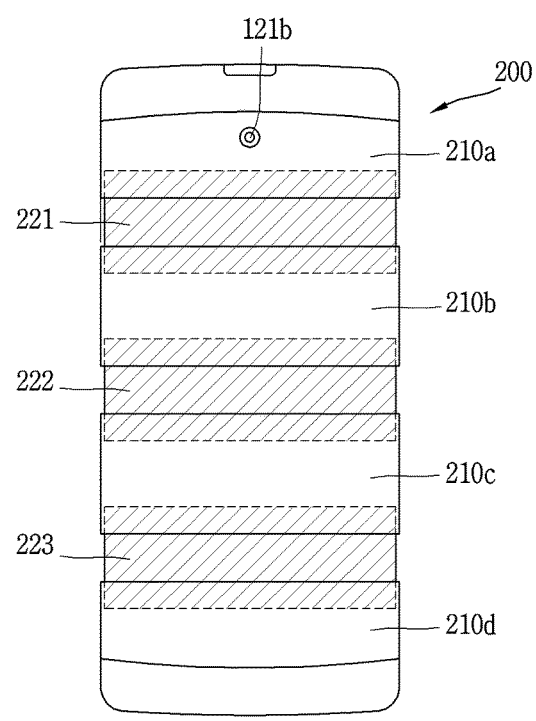
FIG. 9B is a view illustrating a rear surface of a mobile terminal in a second state according to an embodiment of the present disclosure.

FIG. 9A is a rear view of the mobile terminal 200 in a first state in an embodiment of the present invention, and FIG. 9B is a rear view of the mobile terminal 200 in a second state in an embodiment of the present invention. Referring to FIGS. 9A and 9B, the case 210 covering the rear surface of the mobile terminal 200 is divided into first to fourth divided cases 210*a*, 210*b*, 210*c* and 210*d*, and the first to third frames 221, 222 and 223 are provided below the divided cases 210*a*, 210*b*, 210*c* and 210*d*. In the first state, the rear surface of the mobile terminal 200 is the same as a rear surface of a conventional mobile terminal except that the rear surface of the mobile terminal 200 is divided into the plurality of regions. However, in the second state, the rear surface of the mobile terminal 200 is elongated in a longitudinal direction (first direction) of the mobile terminal 200. The first through third frames 221, 222 and 223 are exposed to the outside by the movement of the first through fourth divided cases 210*a*, 210*b*, 210*c* and 210*d*.

In FIG. 9B, it is illustrated that all of the first through fourth divided cases 210*a*, 210*b*, 210*c*, and 210*d* are moved, but, although at least any one of the first through fourth divided cases 210*a*, 210*b*, 210*c*, and 210*d* is moved, the display unit 251 may be expanded or contracted. Also, movable distances of the first through fourth divided cases 210*a*, 210*b*, 210*c*, and 210*d* may be the same or different from each other, but, in an embodiment of the present invention including FIG. 9B, it is illustrated that all the movable distances are the same.

Figure 10A:
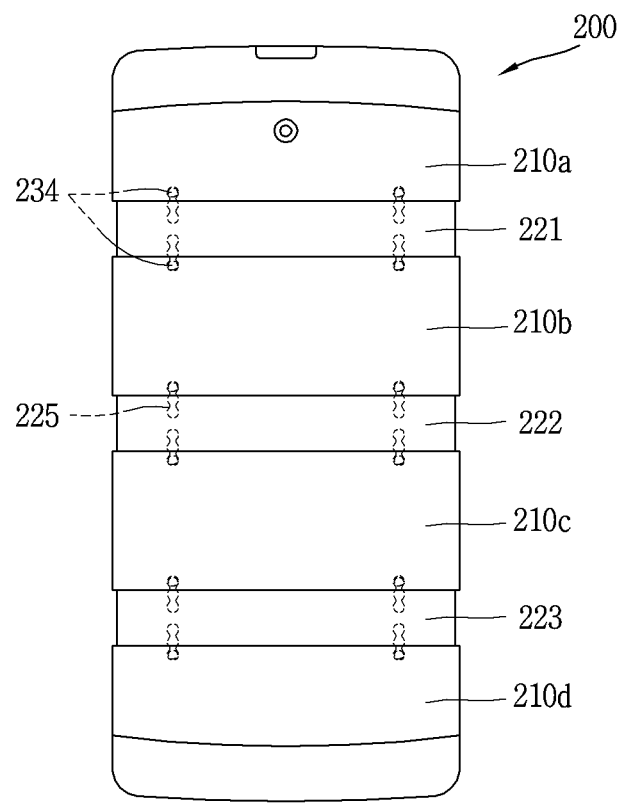
FIG. 10A is a view illustrating a rear surface of a mobile terminal having frames with a guide having a recess related to an embodiment of the present disclosure.
Figure 10B:
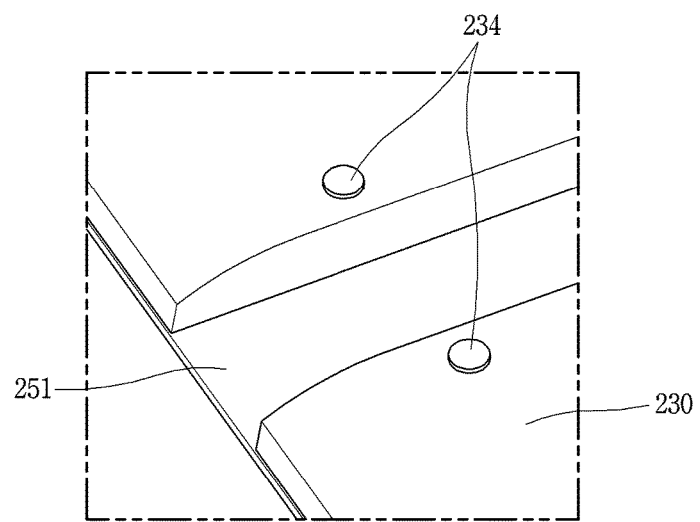
FIG. 10B is a view illustrating a protrusion formed in a housing related to an embodiment of the present disclosure.
Figure 10C:
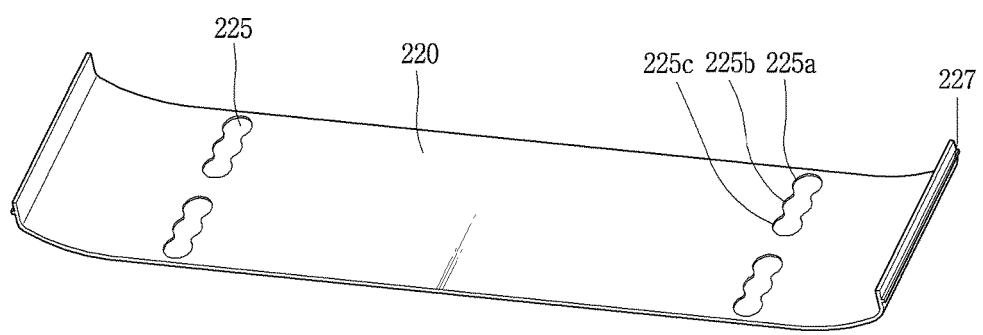
FIG. 10C is a view illustrating an inner surface of a frame related to an embodiment of the present disclosure.
Figure 10D:
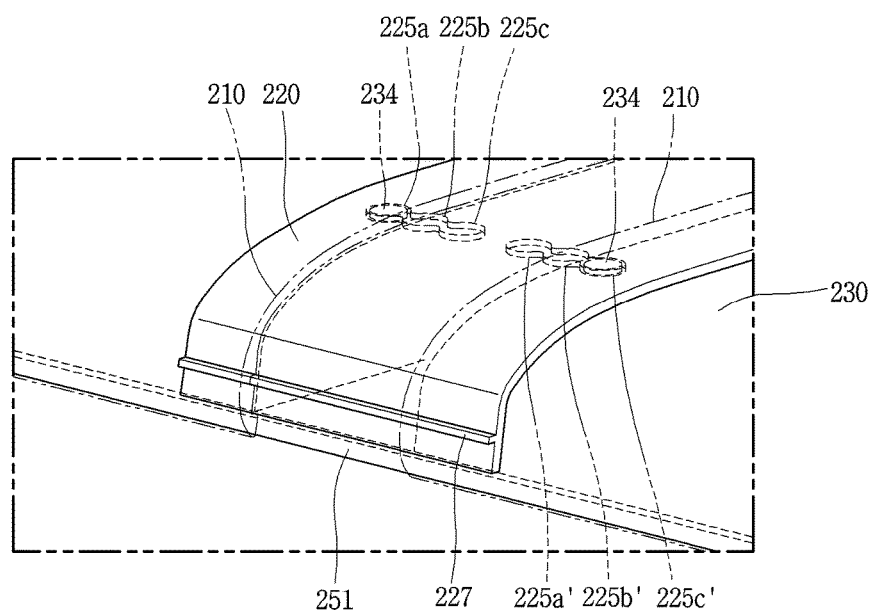
FIG. 10D is a view illustrating that a coupling position of a guide and a protrusion is changed according to movement of a housing related to an embodiment of the present disclosure.

FIG. 10A is a rear view of the mobile terminal 200 having frames 221, 222 and 223 formed with guides 225 having recesses 225*a*, 225*b* and 225*c* according to an embodiment of the present invention. FIG. 10B illustrates protrusions 234 formed on the housing 230 related to an embodiment of the present invention, FIG. 100 illustrates an inner surface of the frame 220 related to an embodiment of the present invention, and FIG. 10D illustrates that a coupling position of the guide 224 and the protrusion 234 is changed according to movement of the housing 230 according to one embodiment of the present invention.

In an embodiment of the present invention, movement distances of the divided cases 210*a*, 210*b*, 210*c*, and 210*d* may be adjusted to one or more stages. That is, the size of the mobile terminal 200 may be adjusted by the user by stages. For example, as shown in FIGS. 10A to 10D, the relative movement distance of the housing 230 and the frame 220 may be varied by multiple stages by a coupling structure of the projection 234 and the guide 225 or the relative movement distance of the frame 220 and the case 210 may be changed by multiple stages by a coupling structure of the protrusions and recesses.

Referring to FIGS. 10A to 10D, protrusions 234 are formed on each of the sub-housings 230*a*, 230*b*, 230*c* and 230*d* and two or more recesses 225*a*, 225*b* and 225*c* and a guide 225 having two or more recesses 225*a*, 225*b*, and 225*c* is formed on an inner surface of the frame 220. The protrusions 234 are moved along the recesses 225*a*, 225*b*, and 225*c* formed in the guide 225. Two or more recesses 225*a*, 225*b* and 225*c* may be continuously formed so that the protrusions 234 sequentially move along the recesses 225*a*, 225*b* and 225*c* to thereby expand and contract the display section 251 at multiple stages.

The guides 225 may be spaced apart from each other at predetermined intervals, and two or more of the guides 225 may be formed on each of the frames 220. For example, two or more guides 225 may be formed in a width direction of the mobile terminal 200. In addition, the protrusions 234 formed in two adjoining sub-housings 230*a*, 230*b*, 230*c*, and 230*d* may be inserted into the guide 225 so as to be moved. To this end, as shown in FIG. 10C, four guides 225 are formed on an inner surface of the single frame 220.

FIG. 10D illustrates a state in which the protrusions 234 formed to be adjacent to each other or the sub-housings 230*a*, 230*b*, 230*c*, and 230*d* having the projections 234 are moved. That is, in the first state, the protrusions 234 are formed in recesses 225*a*' and 225*c* formed in the closest position among the recesses 225*a*, 225*b*, 225*c*, 225*a*', 225*b*', 225*c*' of the pair of guides 225 formed to be adjacent to each other in a longitudinal direction of the mobile terminal 200, and in the second state, the protrusions 234 are disposed in the recesses 225*a* and 225*c*' formed at the farthest positions from each other among the recesses 225*a*, 225*b*, 225*c*, 225*a*', 225*b*', 225*c*' of the guides 225. Of course, at least one of the protrusions 234 may be disposed in the recesses 225*b* and 225*b*' provided in the middle of the guide 225 to realize multi-step expansion and contraction of the display unit 251.

Although the protrusions 234 are formed on the upper surfaces of the sub-housings 230*a*, 230*b*, 230*c* and 230*d* and the guide 225 is provided on the inner surface of the frame 220, for example, but the present invention is not limited thereto. A second protrusion (not shown) may formed on the upper surface of the frame 220 and two or more recesses (not shown) may be formed on the inner surfaces of the divided cases 210*a*, 210*b*, 210*c* and 210*d* and a second guide (not shown) in which the second protrusion is movable along the recesses may be formed.

The second protrusion and the second guide have the same coupling relation as that of the protrusion 234 and the guide 225 described above, so a detailed description thereof will be omitted.

The stretchable display unit 251 in the embodiment of the present invention may be restored to its original state when an external force is removed. After the stretchable display unit 251 is changed from the first state to the second state, restoration to the first state should be suppressed in order to maintain the second state.

Figure 11A:
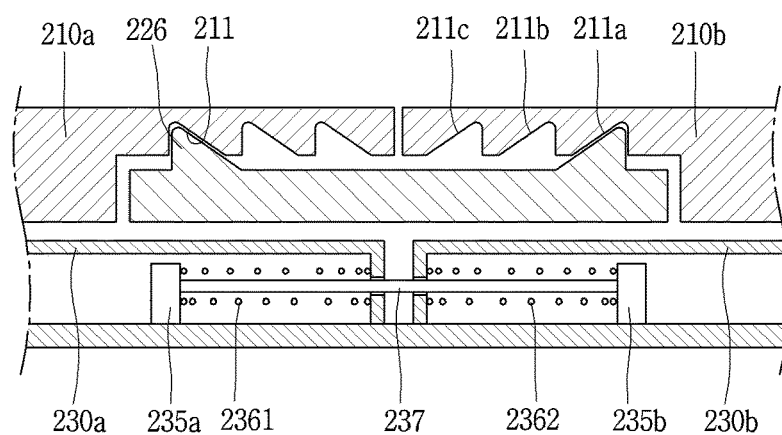
FIG. 11A is a partial cross-sectional view of a mobile terminal in a first state according to an embodiment of the present disclosure.
Figure 11B:
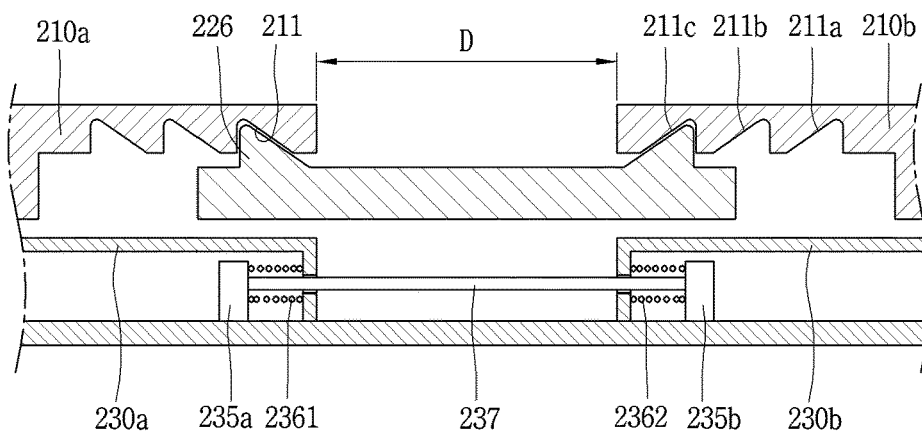
FIG. 11B is a partial cross-sectional view of a mobile terminal in a second state.

FIG. 11A is a partial cross-sectional view of the mobile terminal 200 in the first state according to an embodiment of the present invention, and FIG. 11B is a partial cross-sectional view of the mobile terminal 200 in the second state according to an embodiment of the present invention. A method for maintaining the second state will be described with reference to FIGS. 11A and 11B.

The method for maintaining the second state described with reference to FIGS. 11A to 11C may be applied to all the embodiments of the present invention unless specifically contradicted.

In FIGS. 11A and 11B, when two housings arranged adjacent to each other among the plurality of sub-housings 230*a*, 230*b*, 230*c* and 230*d* are referred to as first and second sub-housings 230*a* and 230*b*, a shaft 237 penetrates through the first and second sub-housings 230*a* and 230*b* and both ends of the shaft 237 are fixed to first and second fixing parts 235*a* and 235*b* of the first and second sub-housings 230*a* and 230*b*, a first elastic body 2361 is formed on an outer circumference of the shaft 237 and provided between the first fixing part 235*a* and the first sub-housing 230*a*, a second elastic body 2361 is formed on the outer circumference of the shaft 237 and provided between the second fixing part 235*b* and the second sub-housing 230*b*. The first and second elastic members 2361 and 2362 may be springs.

The first and second fixing parts 235*a* and 235*b* are fixed to the display unit 251.

As illustrated in FIG. 11A, in the first state, the adjacent divided cases 210*a* and 210*b* are in contact with each other, first and second arrest recesses 211*a*, 211*b*, and 211*c* are formed on inner surfaces of the divided cases 210*a* and 210*b*, and a pair of protrusions 226 are formed on an outer surface of the frame 220. The arrest recesses 211*a*, 211*b*, and 211*c* oppose to each other in the adjacent divided cases 210*a* and 210*b*.

The protrusion 226 is caught by the arrest recess 211 to prevent the case 210 from being moved to the first state. More specifically, the pair of projections 226 are fixed to the first arrest recess 211*a*, respectively. Here, a restoring force rarely acts on the first and second elastic members 2361 and 2362.

However, as shown in FIG. 11B, in the second state, the adjacent divided cases 210*a* and 210*b* are spaced apart from each other by a predetermined distance D. The frame 220 is stopped and as the divided cases 210a and 210b are moved, the arrest recess 211a is moved so that the protrusions 226 are placed in the arrest recess 211b or 211c in a position different from that in the first state. Here, a restoring force greater than that in the first state acts on the first and second elastic members 2361 and 2362. Thereafter, when the frame 220 is slightly pushed from above or the mobile terminal 200 is slightly bent to be convex downwards, the coupling of the protrusion 226 in the arrest recess 211 is released to the first state.

Here, modulus of elasticity of the first and second elastic members 2361 and 2362 may be the same or may be sequentially increased or decreased in the first direction in which the divided cases 210a, 210b, 210c, and 210d move. In addition, it is also possible to make it symmetrical about a certain point.

Figure 11C:
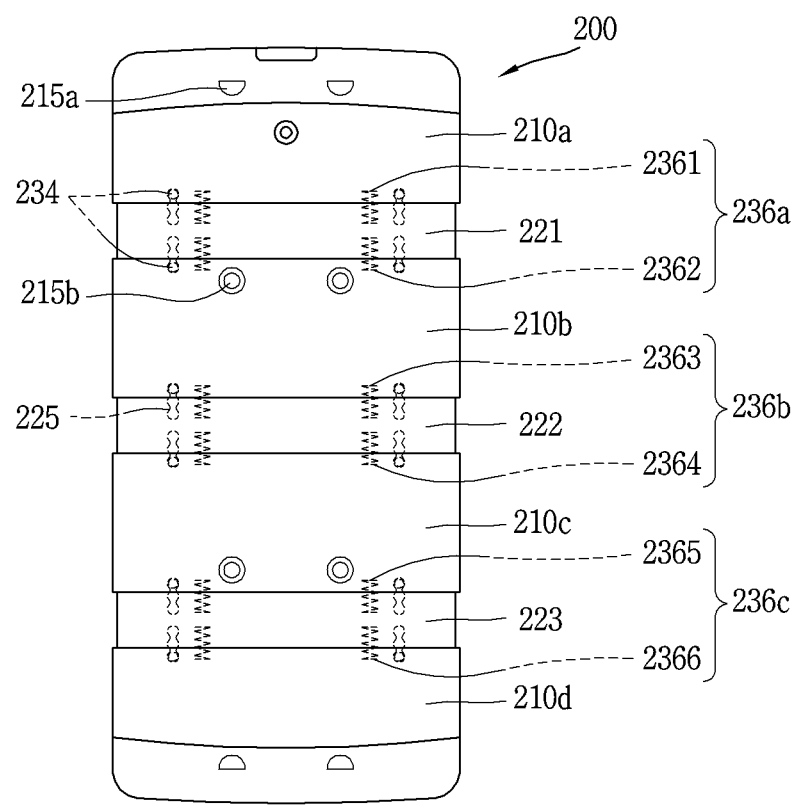
FIG. 11C is a rear view of a mobile terminal according to an embodiment of the present disclosure.

A case where the case 210 of the mobile terminal 200 is divided into the first to fourth divided cases 210a, 210b, 210c and 210d as illustrated in FIG. 11C, and the frame 220 is divided into the first to third frames 221, 222 and 223 will be described hereinafter.

When an elastic member positioned between the first divided case 210a and the second divided case 210b is referred to as a first elastic member 236a, an elastic member positioned between the second divided case 210b and the third divided case 210c is referred to as a second elastic member 236b, an elastic member positioned between the third divided case 210c and the fourth divided case 210d is referred to as a third elastic member 236c, and elastic force is increased in order of the first elastic member 236a, the second elastic member 236b, and the third elastic member 236c, the fourth divided case 210d, the third divided case 210c, and the second divided case 210b may be sequentially moved. Accordingly, exposed regions may be reduced in order of the third frame 223, the second frame 222, and the first frame 221.

If the modulus of elasticity of the first and third elastic members 236a and 236c are the same and the modulus of elasticity of the second elastic member 236b is greater, the first divided case 210a and the fourth divided case 210d may be easily moved, and thus, the regions of the first and third frames 221 and 223 may be first exposed to the outside, relative to the region of the second frame 222. However, if the user pulls the first and fourth divided cases 210a and 210d more strongly, the exposed regions of the first to third frames 221, 222 and 223 will eventually become the same. This relates to the length of the guide 225, and thus, exposed regions of the first to third frames 221, 222, and 223 may be differentiated by differentiating lengths of the guide 225 (more specifically, the number of recesses formed in the guide 223).

In this manner, the exposed regions of the first to third frames 221, 222 and 223 may be sequentially reduced or enlarged, and the exposed regions of the second frame 222 may be greater or smaller than the exposed regions of the first and third frames 221 and 223.

Further, the first to third elastic members 236a, 236b and 236c may be further subdivided. For example, the first elastic member 236a may include a first elastic body 2361 formed on the first sub-housing 230a and a second elastic body 2362 formed above the second sub-housing 230b and facing the first elastic body 2362. The second elastic member 236b may include a third elastic body 2363 formed below the second sub-housing 230b and a fourth elastic member 2364 formed above the third sub-housing 230c facing the second sub-housing 230b and facing the third elastic body 2363. The third elastic member 236c may include a fifth elastic body 2365 formed below the third sub-housing 230c and a sixth elastic body 2366 formed on the fourth sub-housing 230d facing the third sub-housing 230c, and facing the fifth elastic body 2365.

By subdividing the first to third elastic members 236a, 236b and 236c into the first to sixth elastic bodies 2361, 2362, 2363, 2364, 2365 and 2366 in this manner, the display unit 251 may be expanded and contracted variously.

For example, the modulus of elasticity of the first to sixth elastic members 2361, 2362, 2363, 2364, 23365, 2336 may be adjusted to be sequentially increased or decreased, the modulus of elasticity of the third and fourth elastic members 2363 and 2364 may be adjusted to be equal, and the magnitude of the modulus of elasticity may be adjusted to be sequentially increased or decreased away from the center.

Six guides 225 are formed to correspond to the first to sixth elastic bodies 2361, 2362, 2363, 2364, 2365, 2366, and the number of the recesses formed in the six guides 225 may be different. More specifically, as the magnitude of the modulus of elasticity is increased, the number of recesses 225a, 225b, and 225c formed in the six guides 225 corresponding to the first through sixth elastic bodies 2361, 2362, 2363, 2364, 2365, and 2366 may be increased and the number of recesses 225a, 225b, and 225c formed in the guide 225 may be reduced as the elastic force is smaller.

As described above, since the number of the recesses formed in the first to sixth elastic bodies (first to third elastic members) and in the guide 225 are different, the display unit 251 may be expanded and contracted variously.

Figure 12A:
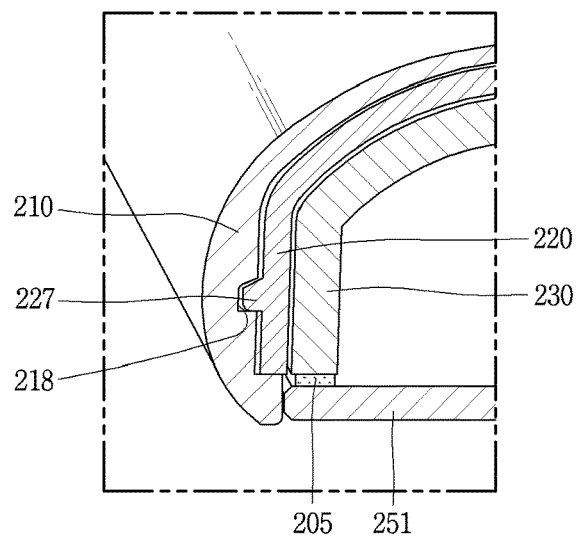
FIG. 12A is a cutaway perspective view of a portion of a mobile terminal according to an embodiment of the present disclosure.
Figure 12B:
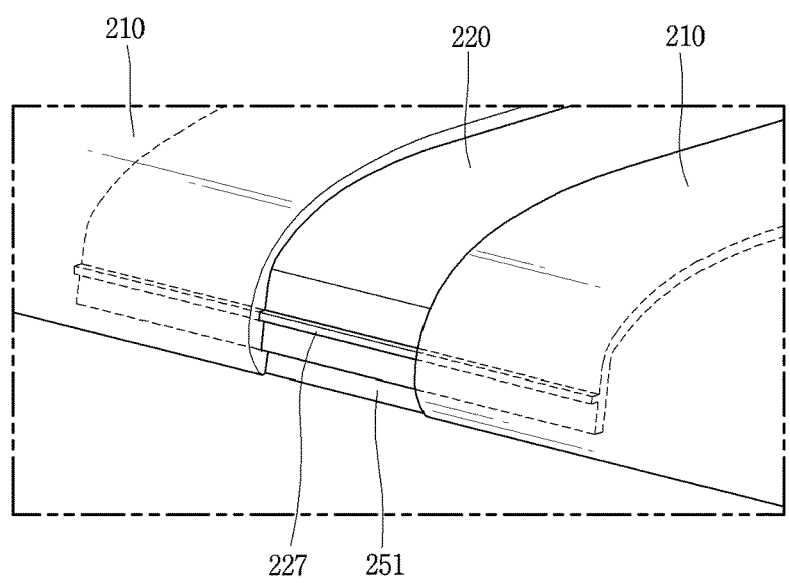
FIG. 12B is a side perspective view of the portion illustrated in FIG. 12A in a second state.

FIG. 12A is a cutaway perspective view of a portion of the mobile terminal 200 according to an embodiment of the present invention, and FIG. 12B is a side perspective view of a portion shown in FIG. 12A in the second state.

Referring to FIGS. 12A and 12B, a guide rail 227 is formed on a side surface of the frame 220 and a guide recess 218 is formed on an inner side surface of the case 210 so that the case 210 slides on the frame 220. The case 210 is not separated from the frame 220 by the engagement of the guide rail 227 and the guide recess 218.

Figure 13A:
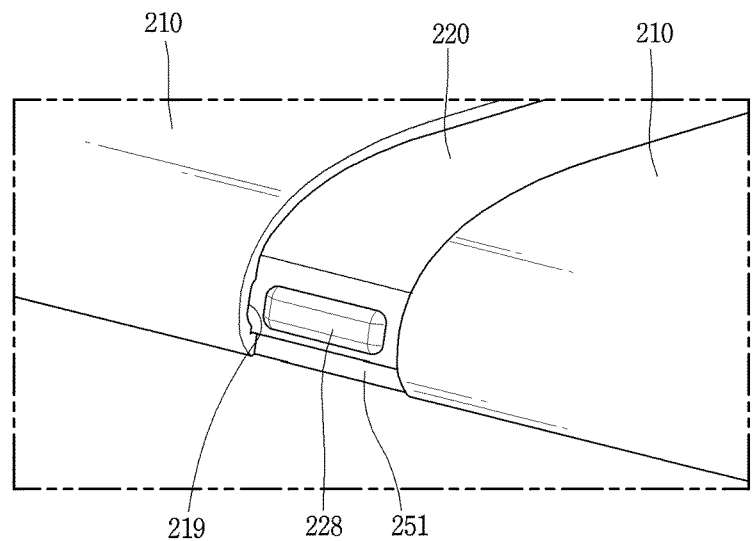
FIGS. 13A and 13B are views illustrating a stopper and a movement limiting unit of a mobile terminal according to an embodiment of the present disclosure.
Figure 13B:
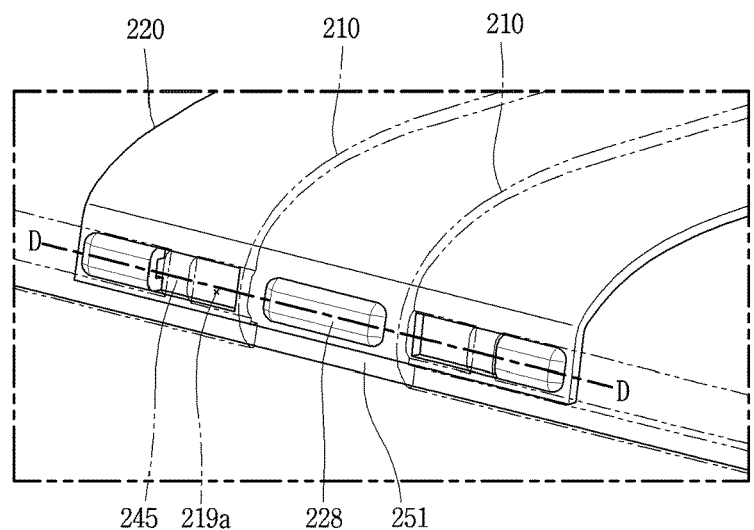
Figure 13C:
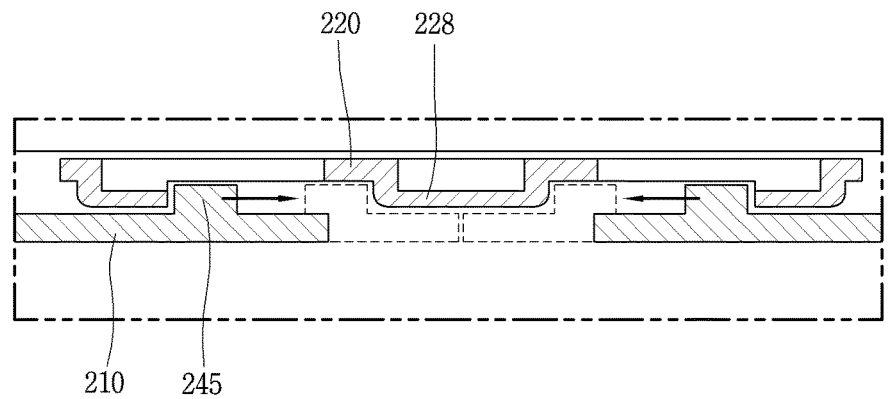
FIG. 13C is a cross-sectional view, taken along line D-D of FIG. 13B.

FIGS. 13A to 13C illustrate a rail structure different from that shown in FIGS. 12A and 12B, in which a stopper 228 and a movement-restricted part 245 are shown. Referring to FIGS. 13A to 13C, the stopper 228 is formed on a side surface of the frame 220, a recess 219a is formed on an inner surface of the case 210, and the movement-restricted part 245 restrained in movement by the stopper 228 is formed at one point of the recess 219a. FIG. 13C is a cross-sectional view taken along line D-D of FIG. 13B. In FIG. 13, it may be seen that the movement-restricted part 245 protruding from the case 210 is caught by the stopper 228 protruding from the frame 220 and prevented from moving further.

Meanwhile, in an embodiment of the present invention, the display unit 251 may be expanded no matter which of the plurality of divided cases 210a, 210b, 210c, and 210d is pulled. To this end, a grip part 215 is depressed inwardly from an outer surface of the plurality of divided cases 210a, 210b, 210c, and 210d.

Figure 6A:
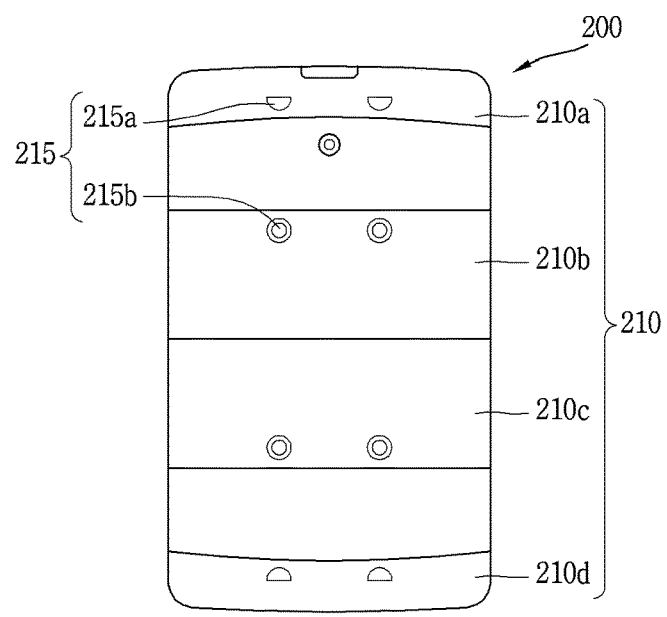
FIG. 6A is a view illustrating a rear surface of a mobile terminal according to an embodiment of the present disclosure.

FIG. 6A is a view illustrating a rear surface of a mobile terminal according to an embodiment of the present disclosure.

That is, FIG. 6A illustrates a rear surface of the mobile terminal 200 according to an embodiment of the present invention. It may be seen that grip parts 215 are depressed on an outer surface of the divided cases 210a, 210b, 210c, and 210d so that the divided cases 210a, 210b, 210c, and 210d may be moved by user's fingers. Here, a material having high frictional force (e.g., leather, rubber, urethane) may be applied to upper and lower divided cases 210a and 210d among the divided cases 210a, 210b, 210c, and 210d so that the display unit 251 may be easily expanded. In addition, using the leather, rubber or urethane material as a decoration member, it is possible to improve completeness of the design and improve grip feeling.

Hereinafter, a grip part 215 formed in the divided case 210a positioned at the upper end and a grip part 215 formed at the lower divided case 210d will be referred to as a first grip part 215a, and grip parts 215 formed at the divided cases 210b and 210c positioned in the middle will be referred to as a second grip part 215b. However, the first and second grip parts 215a and 215b are different in position but not in function. The material with high frictional force may be formed not only on the upper and lower cases 210a and 210d but also on the side outer surface of the case 210 to enhance grip feeling when the display unit 251 is partially expanded. In this manner, in one embodiment of the present invention, the display unit 251 may be partially or entirely expanded by forming the first and second grip parts 215a and 215b.

Figure 6B:
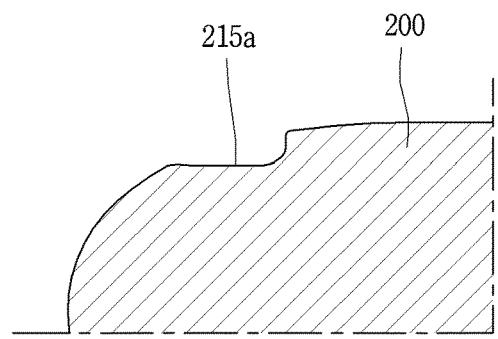
FIG. 6B is a cross-sectional view of a first grip part according to an embodiment of the present disclosure.

FIG. 6B is a cross-sectional view of the first grip part 215a according to an embodiment of the present invention. When the first grip part 215a formed on the upper and lower divided cases 210a and 210d among the divided cases 210a, 210b, 210c and 210d is pulled in both directions, all divided cases 210a, 210b, 210c, and 210d are moved and the display unit 251 is expanded. FIG. 6B illustrates that the upper and lower ends of the mobile terminal 200 form a curved surface toward the end. In the case where the end of the mobile terminal 200 is flat, only the second grip part 215b may be formed.

When the partitioning cases 210b and 210c located in the middle are pulled out, a space between the dividing cases 210b and 210c located in the middle is expanded. In this manner, the user may select the region of the display unit 251 which is expanded depending on which of the grip parts 215a and 215b are pulled. This will be described with reference to FIG. 11C. When the first grip part 215a formed on the first and fourth divided cases 210a to 210d is pulled out, the divided cases 210a, 210b, 210c, 210d which are moved may be varied depending on a magnitude of the modulus of elasticity of the first to third elastic members 236a, 236b and 236c. For example, if the modulus of elasticity of the second elastic member 236b is the largest, the modulus of elasticity of the first and third elastic members 236a and 236c are equal to each other and smaller than the modulus of elasticity of the second elastic member 236b, when the first grip part 215a is pulled, an exposed region of the second frame 222 is small and exposed regions of the first and third frames 221 and 223 are large. When a stronger force is applied, the exposed region of the second frame 222 is gradually increased. Here, if the modulus of elasticity of the second elastic member 236b is significantly greater than those of the first and third elastic members 236a and 236c, the second frame 222 is rarely exposed and only the first and third frames 221 and 223 may be exposed.

FIGS. 14A and 14B are rear views of the mobile terminal 200 according to an embodiment of the present invention. FIG. 14A illustrates the case 210 divided into four parts as described above. FIG. 14B illustrates the case 210 divided into three parts. In FIG. 14A, three frames 221, 222 and 223 are disposed under the divided cases 210a, 210b, 210c and 210d, and in FIG. 14B, one frame 220' is disposed. Here, since components protruding to the outside like the rear camera 121b are provided on the rear surface of the mobile terminal 200, the divided cases 210a, 210b, 210c, and 210d and the frame 220 may be cut such that they may be moved without being caught by the rear camera.

In FIG. 14B, the first to third divided cases 210a', 210b' and 210c' are differentiated, and only the first and third divided cases 210a' and 210c' have a grip part 215a. When the first to third divided cases 210a', 210b', 210c' are moved, a portion of the single frame 220' is exposed to the outside.

Figure 7A:
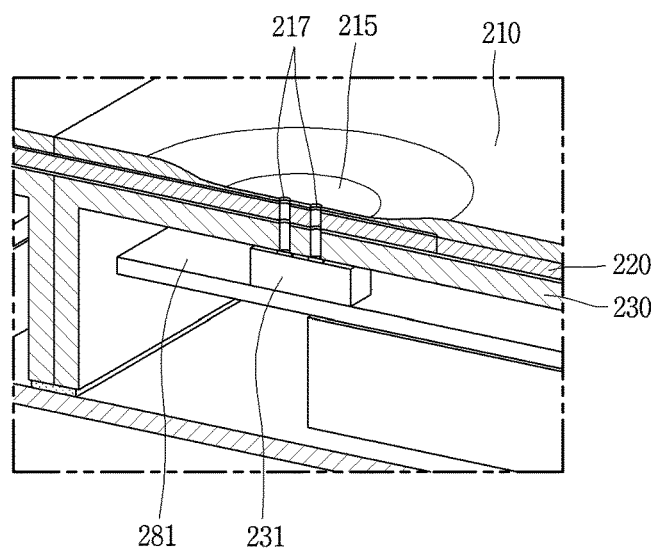
FIGS. 7A and 7B are views illustrating a grip part according to an embodiment of the present disclosure.
Figure 7B:
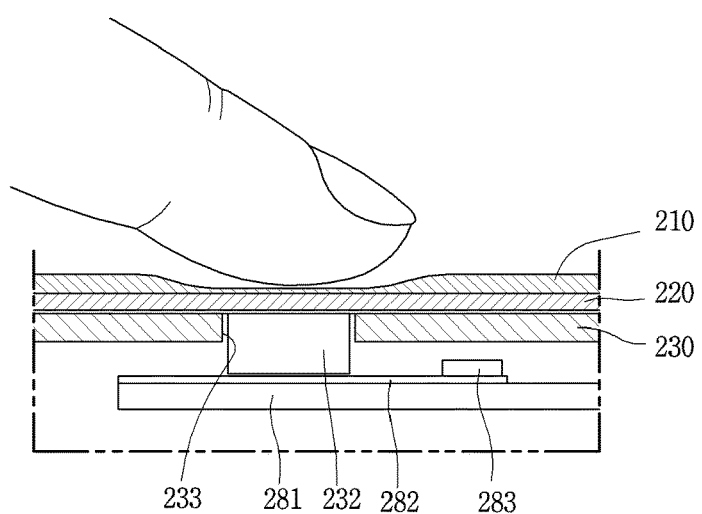

FIGS. 7A and 7B are views illustrating a grip part according to an embodiment of the present disclosure.

FIGS. 7A and 7B are views illustrating the grip part 215 according to an embodiment of the present invention. A grip sensing unit is formed below the grip part 215 to sense a movement direction of the divided cases 210a, 210b, 210c, and 210d. The grip sensing unit may be any one of a proximity/illumination sensor, a touch sensor, and a fingerprint recognition sensor, and may be any sensor capable of sensing when a part of a human body touches or approaches the grip part 215.

FIG. 7A illustrates a case where the grip sensing unit is a proximity/illumination sensor, and FIG. 7B illustrates a case where the grip sensing unit is a touch sensor or a fingerprint recognition sensor.

Referring to FIG. 7A, when the user touches the grip part 215 with a finger, the grip sensing unit senses the touch. To this end, when the grip sensing unit is a proximity/illumination sensor 231, a pair of fine holes 217 are formed in the grip part 215. One of the pair of fine holes 217 is a light receiving part and the other is for a light emitting part. The proximity/illumination sensor 231 is disposed on the main circuit board 281.

Referring to FIG. 7B, it is illustrated that the grip sensing unit is a touch sensor. A conductor 232 receiving a current due to contact of a part of the user's body is provided under the grip part 215. The conductor 232 is disposed on a flexible circuit board 282 connected to the main circuit board 281 and is disposed in a through hole 233 formed in the housing 230. Here, an IC chip 283 is formed on the flexible circuit board 282 to recognize a touch of the user. That is, although the touch sensor includes the conductor 232, the flexible circuit board 282, and the IC chip 283, the present invention is not limited thereto and a technique for a touch sensor generally used in the art to which the present invention pertains may be applied.

When the touch sensor is provided, a hole may be formed also in the frame 220. However, if the frame 220 is thin enough, a touch may be recognized although a through hole is not formed.

If the grip sensing unit is a fingerprint recognition sensor, a fingerprint recognition sensor may be disposed at the position of the conductor 232, and the other remaining structure is the same as that of the touch sensor. That is, the conductor 232 may be replaced with a fingerprint recognition sensor.

As described above, when the grip sensing unit is the fingerprint recognition unit, the user already registered in the mobile terminal 200 may be recognized. The user who has already registered the fingerprint may register a preferred scheme of expansion of the display unit 251. In this case, when the registered fingerprint of the user is recognized, the display unit 251 may be expanded in the already registered expansion scheme of the display unit 251.

Hereinafter, component fixing scheme, not a module scheme, will be described.

Figure 15A:
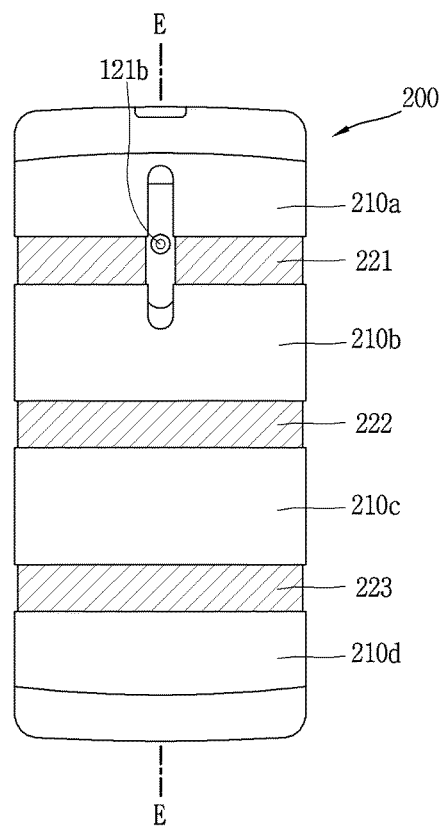
FIG. 15A is a rear view of a mobile terminal according to an embodiment of the present disclosure.
Figure 15B:
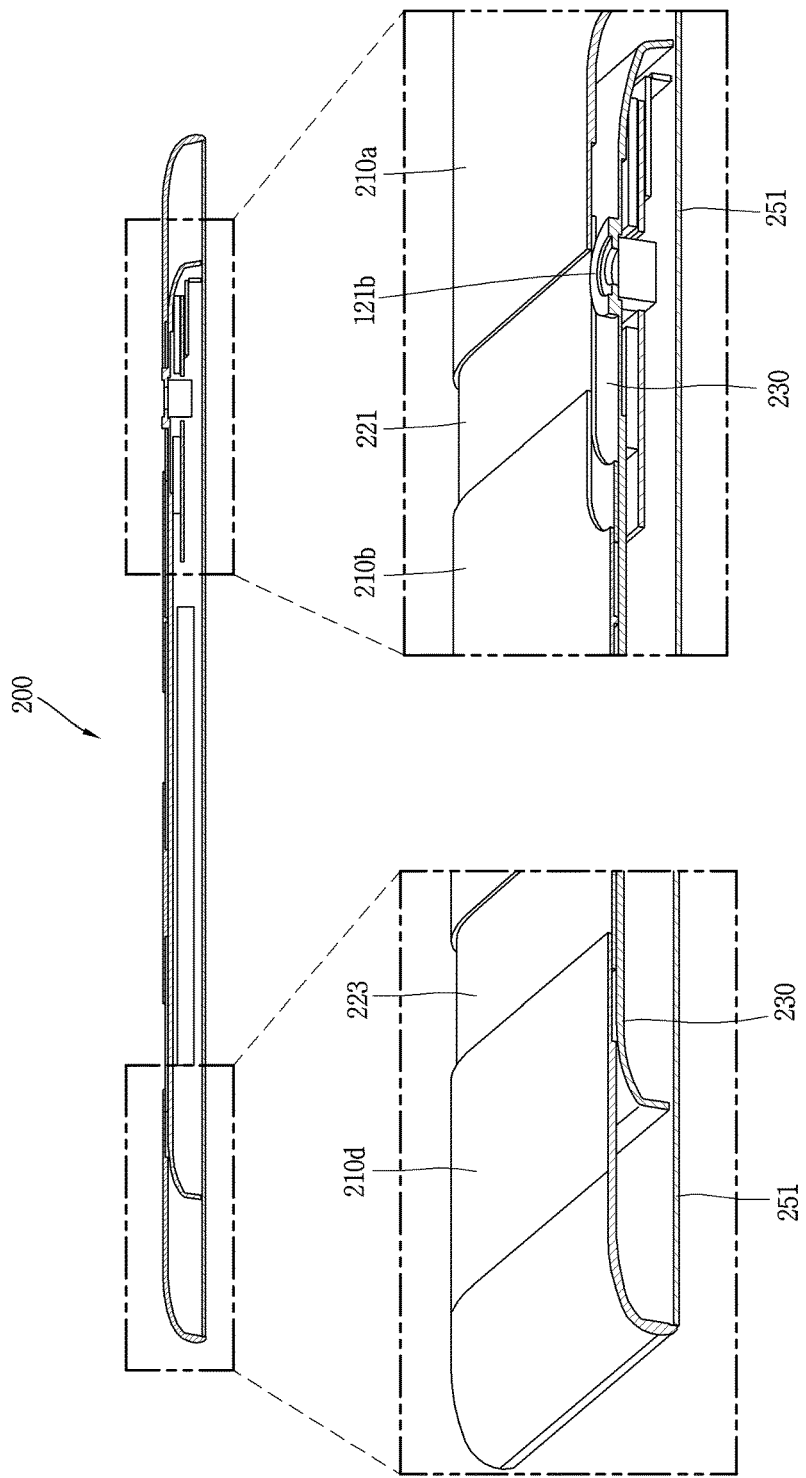
FIG. 15B is a cross-sectional view, taken along line E-E of FIG. 15A.

FIG. 15A is a rear view of a mobile terminal 200 according to an embodiment of the present invention, and FIG. 15B is a cross-sectional view, taken along the line E-E of FIG. 15A. Referring to FIGS. 15A and 15B, it is illustrated that components are covered by the single housing 230 without dividing the components formed on the circuit board into a plurality of regions. In this manner, in an embodiment of the present invention, the components may be fixed and prevented from moving. Also, here, the case 210 may be divided into first to fourth divided cases 210a, 210b, 210c and 210d, and the first to fourth divided cases 210a, 210b, 210c and 210d may be moved at the same distance or different distances. In this case, since the end portions of the first and fourth divided cases 210a and 210d provided at the upper and lower ends of the mobile terminal 200 are spaced apart from the single housing 230, terminals such as a wired/wireless headset, a charger, a memory card, an earphone, or the like may be difficult to use.

In this manner, in an embodiment of the present invention, the display unit 251 may be expanded and contracted by moving the display unit 251 and only the divided cases 210a and 210d formed at the upper and lower ends in a state where the components of the mobile terminal 200 are fixed (See FIGS. 15A and 15B), or the display unit 251 may be expanded and contracted by dividing the components of the mobile terminal 200 into a plurality of modules and differentiating the sub-housings 230a, 230b, 230c and 230d covering the respective modules.

Further, even in the case of applying the component fixing scheme, the case 210 may be divided into a plurality of divided cases 210a, 210b, 210c, and 210d. In order to reduce a movement distance of the second and third divided cases 210b and 210c, preferably, the second and third divided cases 210b and 210c are moved together. However, since the components are not moved, the divided cases 210a, 210b, 210c, and 210d must be separated from the housing 230 covering the components. In this manner, the plurality of divided frames may be formed, while employing the component fixing scheme, but in the case of the scheme in which components are not moved, preferably, the first to third divided cases 210a', 210b', and 210c' are formed and the frame 220' is formed a single frame as illustrated in FIG. 14B.

Figure 16A:
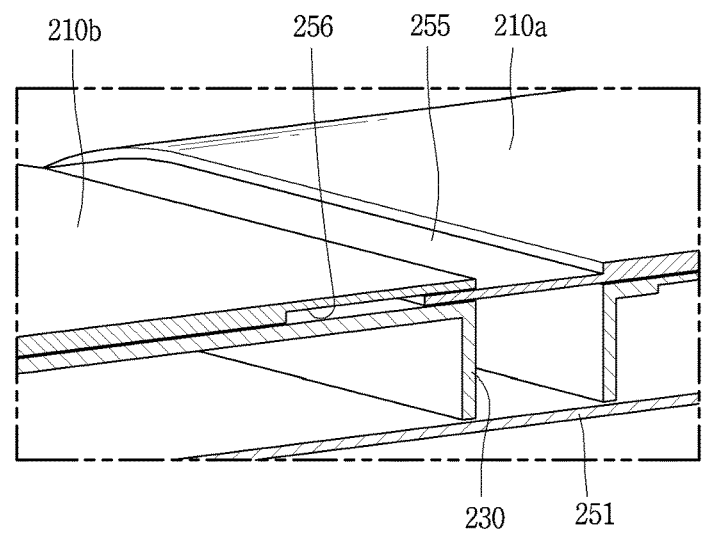
FIG. 16A is a partial cutaway perspective view of a mobile terminal without a frame according to an embodiment of the present disclosure.
Figure 16B:
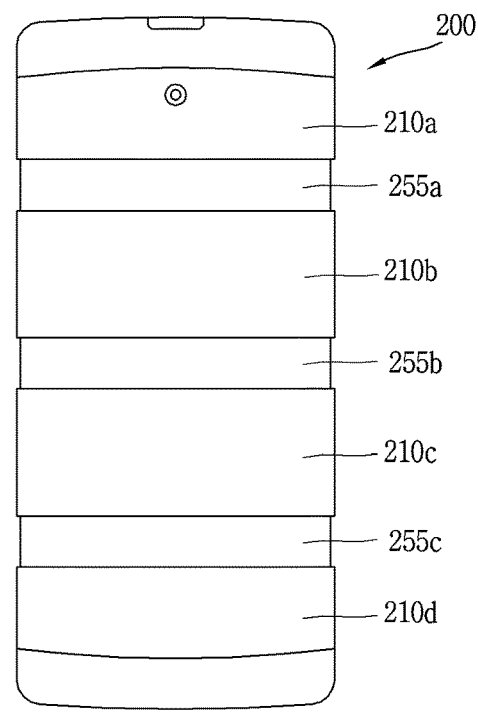
FIG. 16B is a rear view of a mobile terminal without a frame according to an embodiment of the present disclosure.

FIG. 16A is a partial cutaway perspective view of the mobile terminal 200 without the frame 220 according to an embodiment of the present disclosure, and FIG. 16B is a rear view of the mobile terminal 200 without the frame 220 according to an embodiment of the present disclosure.

Referring to FIG. 16A, it may be seen that the divided cases 210a, 210b, 210c, 210d include first and second divided cases 210a, 210b disposed adjacent to each other and the frame 220 is omitted between the first and second divided cases 210a and 210b and the housing 230. When the frame 220 is omitted, the inside of the mobile terminal 200 may be exposed to the outside when the first and second divided cases 210a and 210b are moved and FIG. 16 provides a method for preventing this.

In FIG. 16A, an extending part 255 and an accommodating part 256 are formed in the first and second divided cases 210a and 210b, respectively, instead of omission of the frame 220. That is, an extending part 255 is formed to be stepped down from an end portion of the first divided case 210a, and the accommodating part 256 is formed at an end portion of the second divided case 210b and recessed toward an upper surface from a lower surface to accommodate the extending part 255. Accordingly, the inside of the terminal 200 is concealed when the first and second divided cases 210a and 210b are moved. In this case, as shown in FIG. 16B, only the case 210 is exposed on the rear surface of the mobile terminal 200, so that a sense of unity of design and color may be provided. That is, in FIG. 16B, the upper surfaces of the first through third extending parts 255a, 255b, and 255c are exposed together with the upper surfaces of the first through fourth divided cases 210a, 210b, 210c, and 210d. A total thickness of the extending part 255 and the accommodating part 256 is preferably equal to the thickness of the first or second divided case 210a or 210b. If the total thickness of the extending part 255 and the accommodating part 256 is greater than the thickness of the first or second divided case 210a or 210b, any one of the first and second divided cases 210a and 210b should protrude further outwards. On the other hand, when the total thickness of the extending part 255 and the accommodating part 256 is smaller than the thickness of the first or second divided case 210a or 210b, any one of the first divided case 210a or the second divided case 210b should be recessed.

For example, in FIG. 16A, if the total thickness of the extending part 255 and the accommodating part 256 is larger than the thickness of the first divided case 210a, an upper surface of the second divided case 210b may be positioned higher than an upper surface of the first divided case 210a. On the other hand, if the total thickness of the extending part 255 and the accommodating part 256 is smaller than the thickness of the first divided case 210a, the upper surface of the second divided case 210b may be positioned lower than the upper surface of the first divided case 210a. In order to prevent this, it is preferable that the first and second divided cases 210a and 210b have the same thickness, and the extending part 255 and the accommodating part 256 are in contact with each other and slidably move. If the thicknesses of the first through fourth divided cases 210a, 210b, 210c and 210d are all the same, an effect that a single case 210 is formed when the rear surface of the mobile terminal 200 is viewed in the first state may be obtained.

FIG. 17 is a rear view of the mobile terminal 200 according to an embodiment of the present disclosure. FIG. 17 illustrates an expansion and contraction scheme different from expansion and contraction of the mobile terminal 200 in a longitudinal direction described above. That is, in FIG. 17, it is illustrated that the case 210 of the mobile terminal 200 divided into four cases 210 by a pair of diagonal lines may be pulled in eight (four pairs) directions. That is, FIG. 17 illustrates that the four cases 210 divided by the pair of diagonal lines in the case 210 of the mobile terminal 200 may be pulled in eight directions (four pairs).

That is, the case 210 may be divided into two or more divided cases 210a, 210b, 210c and 210d by one or more diagonal lines of the terminal 200, and the divided cases 210a, 210b, 210c and 210d may be movable in a second direction intersecting the first direction (the longitudinal direction of the mobile terminal 200=y direction in FIG. 3A) described above. In this case, the second direction may be perpendicular to the first direction or a diagonal formation direction.

Here, the case 210 is formed of the first through fourth divided cases 210a', 210b', 210c', and 210d', and the divided cases 210a', 210b', 210c', and 210d' are adjacent to each other. For the convenience sake, it is illustrated that a central protrusion 220a is formed at the center of the mobile terminal 200. However, if the central protrusion 220a is removed, the first to fourth divided cases 210a', 210b', 210c' and 210d' may be brought into contact at least at one point.

Figure 18A:
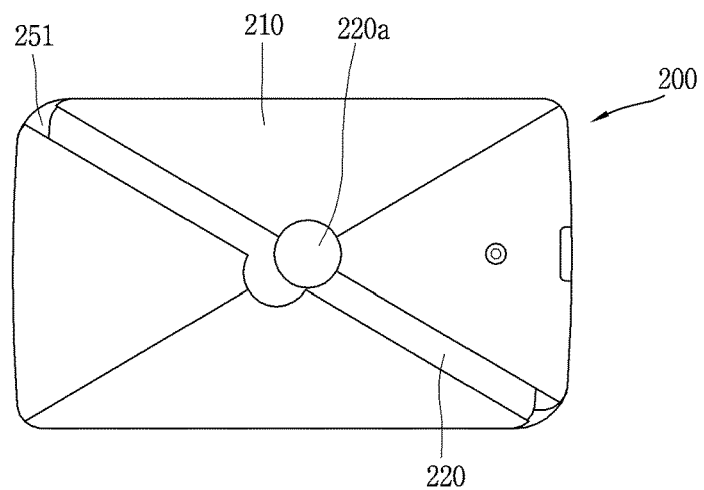
FIGS. 18A and 18B are views illustrating a movement scheme of a divided case when the divided case is divided in a diagonal direction according to an embodiment of the present disclosure.
Figure 18B:
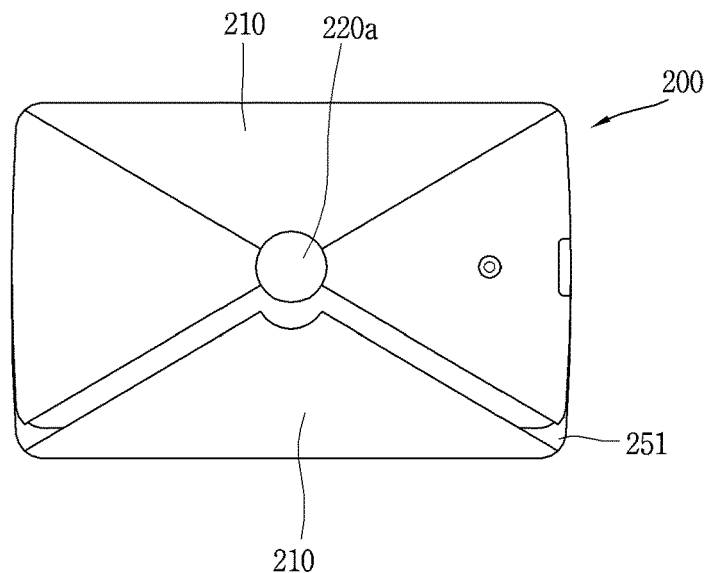

FIGS. 18A and 18B are views illustrating a movement scheme of the divided cases 210a', 210b', 210c', and 210d' when the divided cases 210a', 210b', 210c', and 210d' are divided in a diagonal direction according to an embodiment of the present disclosure. Referring to FIG. 18A, the first and second divided cases 210a' and 210b' are integrally moved, and the third and fourth divided cases 210c' and 210d' are integrally moved. That is, the cases are pulled in the directions of A3 and A4. FIG. 18A illustrates an example of a case where two divided cases among the first through fourth divided cases 210a', 210b', 210c', and 210d' are moved as a pair together, so the present invention is not limited thereto. For example, by pulling the divided cases 210a', 210b', 210c' and 210d' in the A5 and A6 directions, the first and third divided cases 210a' and 210c' and the second and fourth divided cases 210b' and 210d' are expanded as pairs to expand the display unit 251.

FIG. 18B illustrates a case where only any one of the first through fourth divided cases 210a', 210b', 210c' and 210d' is moved. That is, FIG. 18B illustrates that the display unit 251 is expanded by pulling only the third divided case 210c' in the direction of A8. There are various ways of pulling only one of the divided cases 210a', 210b', 210c' and 210d'. Referring to FIG. 17, the first divided case 210a' may be pulled in the A1 direction, the second divided case 210b' may be pulled in the A7 direction, and the fourth divided case 210d' may be pulled in the A2 direction.

In this manner, the case 210 may be divided into the regions by the pair of diagonal lines, and then the divided cases 210a', 210b', 210c' and 210d' may be pulled in various directions, thereby expanding the display unit 251 in various forms. Also, in this case, both the component fixing scheme and the component moving scheme (modular scheme) may be adopted. This may be sufficiently understood by the illustrations of FIGS. 8A to 8C and FIGS. 15A to 15B, and thus detailed drawings thereof have been omitted.

Figure 19:
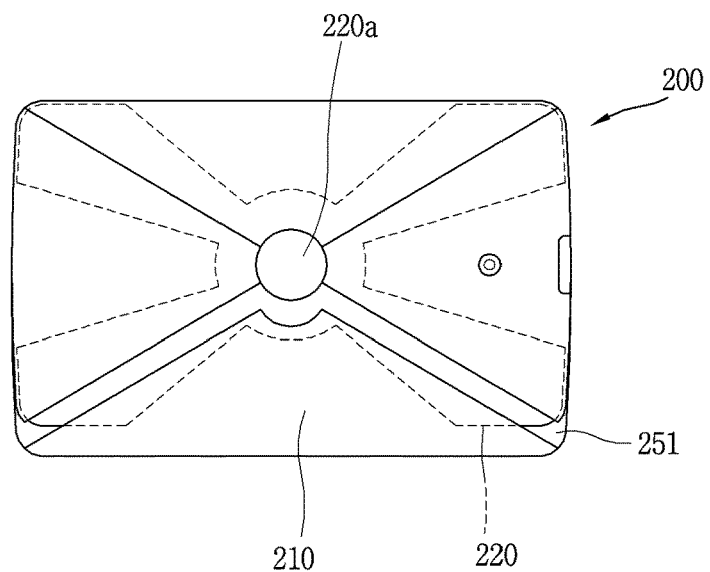
FIG. 19 is an internal perspective view of FIG. 18B.

Also, as illustrated in FIG. 17, although the divided cases 210a', 210b', 210c' and 210d' are formed in the diagonal direction, when the first to fourth divided cases 210a', 210b' 210c', and 210d' are moved, the inside of the mobile terminal 200 must be concealed. To this end, the frame 220 formed in a substantially diagonal direction is disposed below the first through fourth divided cases 210a', 210b', 210c' and 210d'. As illustrated in FIG. 19, the frame 220 may have a substantially butterfly shape. FIG. 19 is an internal perspective view of FIG. 18B, illustrating the frame 220. Referring to FIGS. 18b and 19, it may be seen that the display unit 251 is expanded by the movement of the third divided case 210c'.

Figure 20:
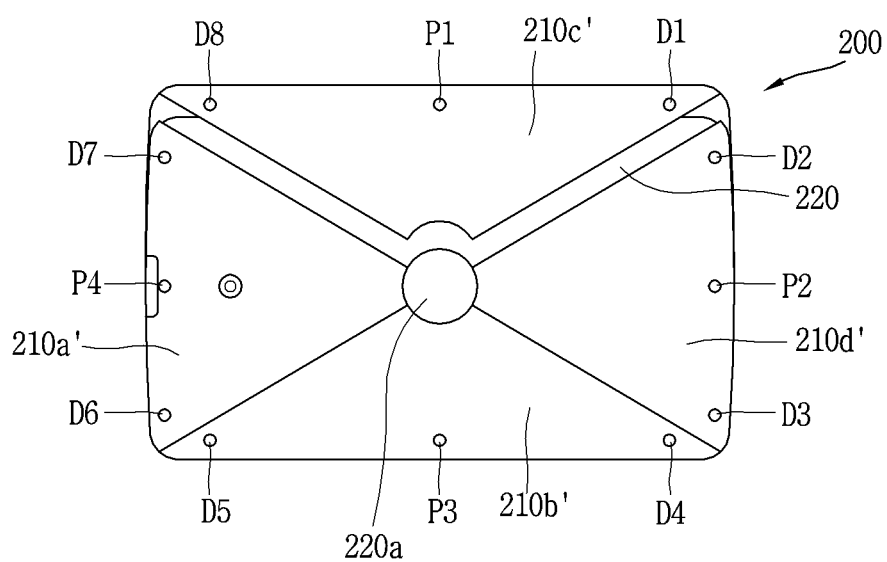
FIG. 20 is a view illustrating a grip part formed on surfaces of first to fourth divided cases according to an embodiment of the present disclosure.

Meanwhile, FIG. 20 is a view of grip parts D1, D2, D3, D4, D5, D6, D7, D8, P1, P2, P3, and P4 formed on surfaces of the first to fourth divided cases 210a', 210b', 210c', and 210d' according to an embodiment of the present invention. Referring to FIG. 20, the grip parts D1, D2, D3, D4, D5, D6, D7, D8, P1, P2, P3, and P4 are formed on the frame 220, and a grip sensing unit is provided below the grip parts D1, D2, D3, D4, D5, D6, D7, D8, P1, P2, P3, and P4 to sense a movement direction of the frame 220. This has already been described with reference to FIGS. 7A and 7B, and therefore, a detailed description thereof will be omitted here and the description with reference to FIGS. 7A and 7B will be given.

The grip parts D1, D2, D3, D4, D5, D6, D7, D8, P1, P2, P3, and P4 and the grip sensing unit are provided on the left, middle, and right sides at a lower end of the divided cases 210a', 210b', 210c', and 210d'. Referring to FIG. 20, it may be seen that the grip parts D1, D2, D3, D4, D5, D6, D7, D8, P1, P2, P3, and P4 are formed in the stretching direction A1-A8. For example, grip parts required for pulling the divided cases in the directions corresponding to A1 and A2 of FIG. 17 are P4 and P2, and grip parts required for pulling the divided cases in the directions corresponding to A7 and A8 are P3 and P1.

Also, in order to pull the divided cases in the directions A3 and A4, the first and second divided cases 210a' and 210b' and the third and fourth divided cases 210c' and 210d' must move integrally, and thus, four grip parts are required. That is, grip parts corresponding to the A3 direction are D5 and D6, the grip parts corresponding to the A4 direction are D1 and D2. Similarly, in order to expand the display unit 251 in the A5 and A6 directions, D7 and D8 and D3 and D4 must be pulled out, respectively.

Here, the grip parts D1, D2, D3, D4, D5, D6, D7, D8, P1, P2, P3, and P4 include D1 to D8 and P1 to P4. D1 to D8 are grip parts for moving the first to fourth divided cases 210a', 210b', 210c', and 210d' in the diagonal direction of the mobile terminal 200, and P1 to P4 are grip parts for moving the first to fourth divided cases 210a' and 210b', 210c', and 210d' in the longitudinal direction or the width direction of the mobile terminal 200.

Figure 21:
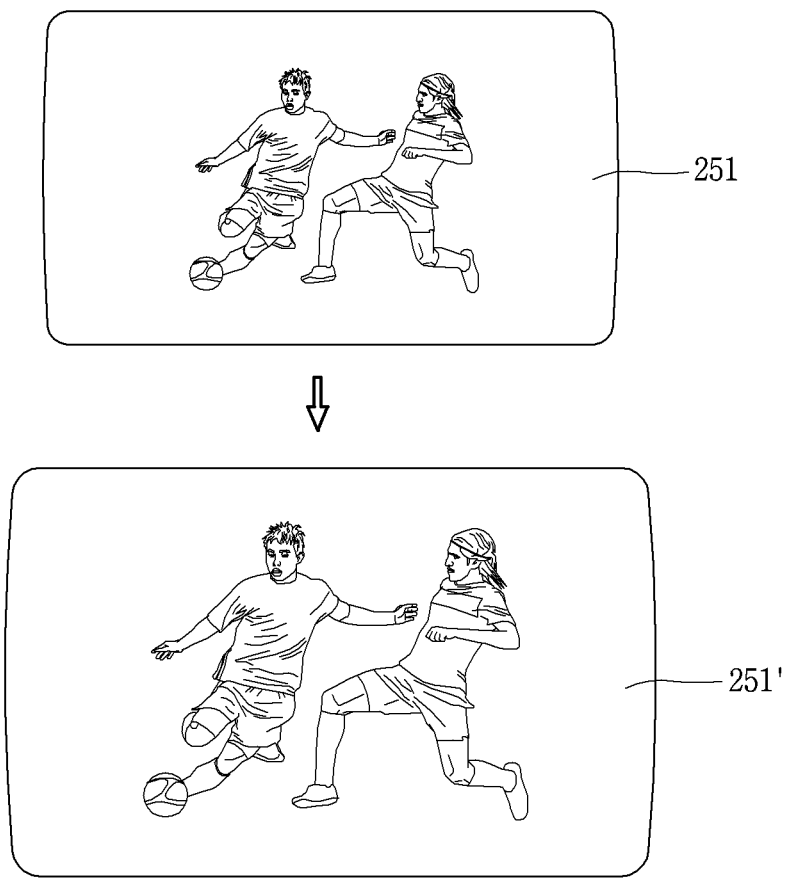
FIG. 21 is a view illustrating an example in which a display unit is expanded, while maintaining an aspect ratio according to an embodiment of the present disclosure.

FIG. 21 is a view illustrating an example in which a display unit is expanded, while maintaining an aspect ratio according to an embodiment of the present disclosure.

Here, as shown in FIG. 21, it is possible to maintain the aspect ratio of the display unit 251 when moving in the plurality of directions.

Figure 22A:
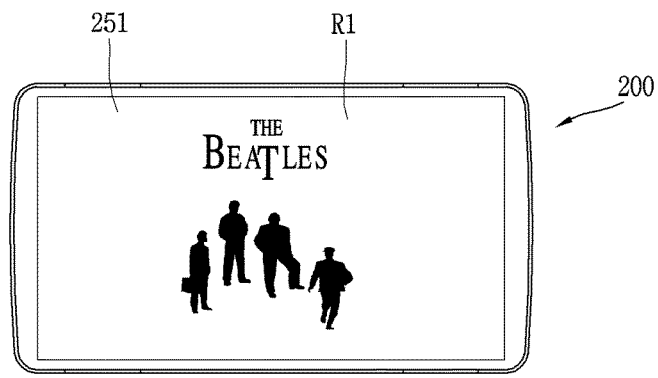
FIGS. 22A to 22C are views illustrating a method for utilizing a display unit according to a degree to which a display unit is expanded according to an embodiment of the present disclosure.
Figure 22B:
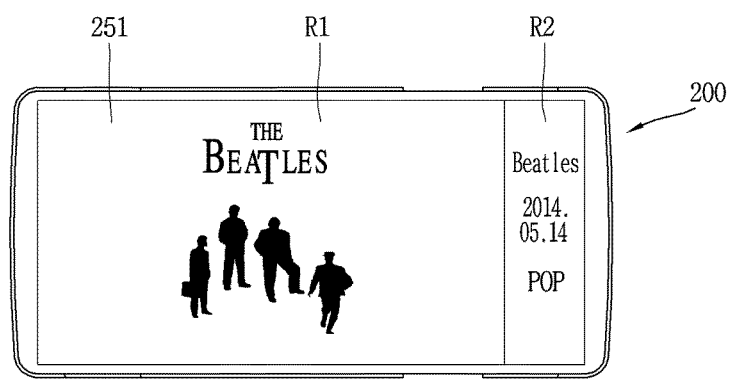
Figure 22C:
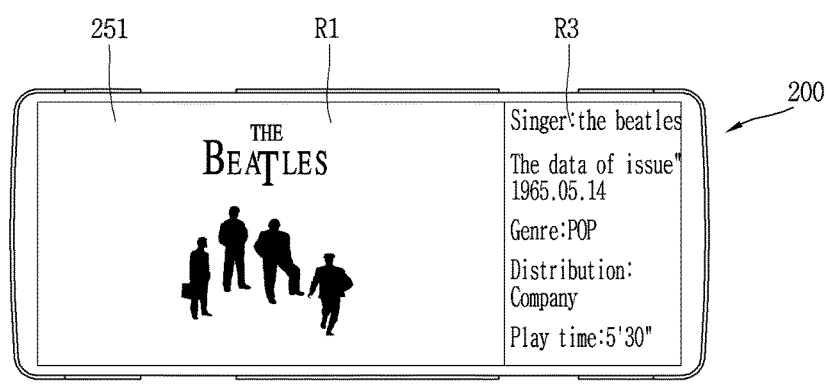

FIGS. 22A to 22C are views illustrating a method for utilizing the display unit 251 according to a degree to which the display unit 251 is expanded according to an embodiment of the present disclosure.

Referring to FIGS. 22A to 22C, in the first state in which the divided cases 210a', 210b', 210c', 210d' are in contact with each other, at least two of the divided cases 210a', 210b', 210c', and 210d' are spaced apart from each other to implement the second state in which the display unit 251 is expanded. In the second state, a first region R1 as a display region in the first state and second regions R2 and R3 expanded in the second state, relative to the first state, are differentiated, and the same or different screens are displayed in the first and second regions R1, R2, and R3. Here, as the display unit 251 is expanded, a size of the second region is further increased (R2<R3).

That is, in the first state, an initial state, image data such as a moving picture is displayed in the first region R1, and in the second state in which the display region is expanded, relative to the first state, screen information regarding an image displayed in the first region R1 of the display unit 251 may be displayed in the expanded region R2. Here, if the display unit 251 is expanded to have a larger area, more specific screen information may be displayed.

FIGS. 22A to 22C illustrate the display unit 251 expanded and contracted in the longitudinal direction (y direction of FIG. 3A) of the mobile terminal 200, but the present invention is not limited thereto, and as shown in FIG. 17, even when the case is expanded in multiple directions, screen information may be displayed in a region expanded as the first state is changed to the second state.

The above-described embodiment of the present invention may be classified into the modular system (see FIGS. 8A to 8C) in which components are modularized and moved together with the display unit and a component fixing scheme (See FIGS. 15A and 15B) in which a component is not moved and only the display unit is expanded and contracted, may be classified into the scheme (See FIGS. 9A and 9B) in which a frame is formed and the scheme (See FIGS. 16A and 16B) in which the frame is omitted, may be classified into a scheme (See FIG. 10A) in which the case is divided into a plurality of parts in the longitudinal direction of the mobile terminal and a scheme (See FIG. 17) in which the case is divided into a plurality of parts in the diagonal direction of the mobile terminal, and may be classified into a type (See FIG. 14A) in which the frame is formed as a plurality of divided frames and a type (See FIG. 14B) in which the single frame is formed.

The above-mentioned schemes may be mixedly applied to each other as long as they are not in conflict with each other. For example, although not specifically described, a frame may be formed or not while applying the modular scheme is applied, and a frame may be formed or not while applying the component fixing scheme is applied.

The present invention described above may be implemented as a computer-readable code in a medium in which a program is recorded. The computer-readable medium includes any type of recording device in which data that may be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

INDUSTRIAL APPLICABILITY

Embodiments of the present invention may be applied to a mobile terminal having a display having stretchability.

The invention claimed is:

1. A mobile terminal comprising:
   a display unit configured to be expanded and contracted in a least one direction;
   a housing located below the display unit, the housing configured to enclose one or more electrical components, the housing having a rear surface opposite the display unit; and
   a case located at the rear surface of the housing, the case covering the rear surface of the housing,
   wherein the case is separated into at least two divided cases, and, when at least one divided case of the divided cases is moved in a first direction relative to another divided case of the divided cases, the display unit is expanded or contracted in response to the movement of the at least one divided case.

2. The mobile terminal of claim 1, wherein each divided case of the divided cases is in direct contact with the display unit or the housing is interposed between each divided case and the display unit so that the display unit is expanded or contracted in response to the movement of the at least one divided case.

3. The mobile terminal of claim 2, further comprising a frame disposed between the housing and the case, the frame being exposed when the divided cases are moved relative to each other.

4. The mobile terminal of claim 3, wherein at least a portion of the frame overlaps the divided cases when the divided cases are moved relative to each other.

5. The mobile terminal of claim 4, wherein the housing includes a plurality of sub-housings spaced apart from each other, each sub-housing of the plurality of sub-housings being located opposite a corresponding divided case of the divided cases, and each sub-housing being movable together with the corresponding divided case.

6. The mobile terminal of claim 5, wherein a sub-housing protrusion is located on an upper side surface of each sub-housing, and
   wherein a guide unit is located in an inner side surface of the frame opposite the sub-housing protrusion of each sub-housing, each guide unit having two or more recesses to receive the corresponding sub-housing protrusion, and the corresponding protrusion being movable along the recesses of the corresponding guide unit.

7. The mobile terminal of claim 6, wherein the plurality of sub-housings includes a first sub-housing and a second sub-housing disposed to be adjacent to the first sub-housing, the first sub-housing and the second sub-housing having a first fixing part and second fixing part, respectively, and
   wherein the mobile terminal further includes:
   a shaft penetrating through the first sub-housing and the second sub-housing, the shaft having a first end fixed to the first fixing part and a second end fixed to the second fixing part;
   a first elastic body located about an outer circumference of the shaft and located between the first fixing part and the first sub-housing; and
   a second elastic body located about the outer circumference of the shaft and located between the second fixing part and the second sub-housing.

8. The mobile terminal of claim 6, wherein a frame protrusion is located on an outer side surface of the frame, and
   wherein an arrest recess is located in an inner side surface of the at least one divided case, and the frame protrusion is configured to be received in the arrest recess to resist movement of the at least one divided case.

9. The mobile terminal of claim 8, wherein the arrest recess is provided in plurality to correspond to the number of recesses formed on the guide unit such that the at least one divided case is movable stepwise.

10. The mobile terminal of claim 5, wherein a plurality of elastic bodies are located in the plurality of sub-housings, and a modulus of elasticity of the plurality of elastic bodies is the same or sequentially increased or decreased in the first direction.

11. The mobile terminal of claim 5, wherein a plurality of elastic bodies are located in the plurality of sub-housings, a modulus of elasticity of elastic bodies formed on opposite sides of an elastic body positioned at a center, among the plurality of elastic bodies, is different from a modulus of elasticity of the elastic body positioned at the center, and the moduli of elasticity of the elastic bodies formed on opposite sides of the elastic body positioned at the center are the same.

12. The mobile terminal of claim 3, wherein a guide rail is formed on a side surface of the frame, and
   wherein a guide recess is formed on an inner side surface of the at least one divided case, and the at least one divided case is slidable on the frame along the guide rail.

13. The mobile terminal of claim 3, wherein stoppers are located on a side surface of the frame, the stoppers being spaced apart from each other,
   wherein a recess is formed on an inner side surface of each divided case, and
   wherein a movement-restricting part is located in each recess to limit movement of each divided case by contact with one of the stoppers.

14. The mobile terminal of claim 5, wherein a grip part is recessed from an outer side surface of each of the divided cases.

15. The mobile terminal of claim 14, wherein a grip sensor is located below the grip part, the grip sensor being configured to recognize a user's grip on the divided case, and wherein the grip sensor is any one of a proximity sensor, an illumination sensor, a touch sensor, and a fingerprint recognition sensor.

16. The mobile terminal of claim 1, wherein the at least one divided case is a first divided case and the another divided case is a second divided case disposed adjacent to the first divided case, wherein the first divided case includes an extending part that is stepped downwards from an end portion of the first divided case, and wherein the second divided case includes an accommodating part that is recessed from a lower surface towards an upper surface at an end portion of the second divided case to accommodate the extending part of the first divided case such that an interior of the mobile terminal is concealed when the first divided case is moved relative to the second divided case.

17. The mobile terminal of claim 3, wherein the case is divided into the at least two divided cases along diagonal lines extending between opposite corners of the mobile terminal, and wherein the divided cases are movable in a second direction perpendicular to the first direction or a direction in which the diagonal line extends.

18. The mobile terminal of claim 17, wherein, when the divided cases are moved in the second direction, an aspect ratio of the display unit is maintained.

19. The mobile terminal of claim 17, wherein a grip part is located in each divided case, and wherein a grip sensor is located below the grip part to sense a movement direction of each divided case.

20. The mobile terminal of claim 1, wherein the mobile terminal is in a first state when the divided cases are in contact with each other, and the display unit has a first display region when the mobile terminal is in the first state, wherein the mobile terminal is in a second state when the at least one divided case is spaced apart from the another divided case, the display unit being expanded when the mobile terminal is in the second state such that the display unit has a second display region that is differentiated from the first display region, and wherein a same or different screens are displayed in the first display region and the second display region.

* * * * *